United States Patent [19]

Okazaki et al.

[11] Patent Number: 5,644,506

[45] Date of Patent: Jul. 1, 1997

[54] PICTURE SIGNAL REPRODUCING METHOD AND PICTURE SIGNAL REPRODUCING APPARATUS

[75] Inventors: Toru Okazaki, Tokyo; Jun Yonemitsu, Kanagawa; Katsumi Tahara, Kanagawa; Yasushi Fujinami, Kanagawa, all of Japan

[73] Assignee: Sony Corporation, Japan

[21] Appl. No.: 397,210

[22] PCT Filed: Jul. 12, 1994

[86] PCT No.: PCT/JP94/01140

§ 371 Date: Apr. 17, 1995

§ 102(e) Date: Apr. 17, 1995

[87] PCT Pub. No.: WO95/02947

PCT Pub. Date: Jan. 26, 1995

[30] Foreign Application Priority Data

Jul. 12, 1993 [JP] Japan .................................. 5-171919

[51] Int. Cl.$^6$ ........................................ H04J 3/00
[52] U.S. Cl. ............................................ 364/514 R
[58] Field of Search .......................... 364/514 R, 514 C; 370/94.1, 82; 395/2; 348/461, 474; 358/380; 455/4.2, 6.3

[56] References Cited

U.S. PATENT DOCUMENTS

| | | | |
|---|---|---|---|
| 4,748,620 | 5/1988 | Adelman et al. | 370/94.1 |
| 4,894,823 | 1/1990 | Adelman et al. | 370/94.1 |
| 5,027,350 | 6/1991 | Marshall | 370/94.1 |
| 5,214,741 | 5/1993 | Akamine et al. | 395/2 |
| 5,229,992 | 7/1993 | Jurkevich et al. | 370/94.1 |
| 5,241,535 | 8/1993 | Yoshikawa et al. | 370/82 |
| 5,287,182 | 2/1994 | Haskell et al. | 348/484 |
| 5,442,390 | 8/1995 | Hooper et al. | 455/4.2 |
| 5,481,543 | 1/1996 | Veltman | 370/94.1 |

OTHER PUBLICATIONS

Yasuda, Hiroshi, "International Standard of Multi-Media Coding", Jun. 30, 1991, Maruzen, pp. 204–236, 126–145.
Yonemitsu, Jun, "MPEEG Standard Plan Video Part (ISO11172 Video)", Image Electronics Society Journal, vol. 20, No. 4, Aug. 1991 (Tokyo), pp. 306–323.

*Primary Examiner*—Ellis B. Ramirez
*Attorney, Agent, or Firm*—Limbach & Limbach LLP

[57] ABSTRACT

Only monitor side is caused to have decoding unit portion for bit stream, and reading unit portion for bit stream, decoding unit portion for bit stream and recording unit portion for bit stream are linked by digital network. Reproducing unit is caused to have a function to reproduce bit stream as it is, and recording unit is caused to have a function to record bit stream as it is. Bit stream reproducing unit and bit stream decoding unit of the monitor side, and such reproducing unit and bit stream recording unit are linked by high speed digital network. Thus, in the case where there is constructed a moving picture reproducing system such that a plurality of moving picture reproducing units are connected to one moving picture display unit to utilize source desired to see by selection of switch, cost can be reduced and degradation of the picture quality can be prevented.

52 Claims, 21 Drawing Sheets

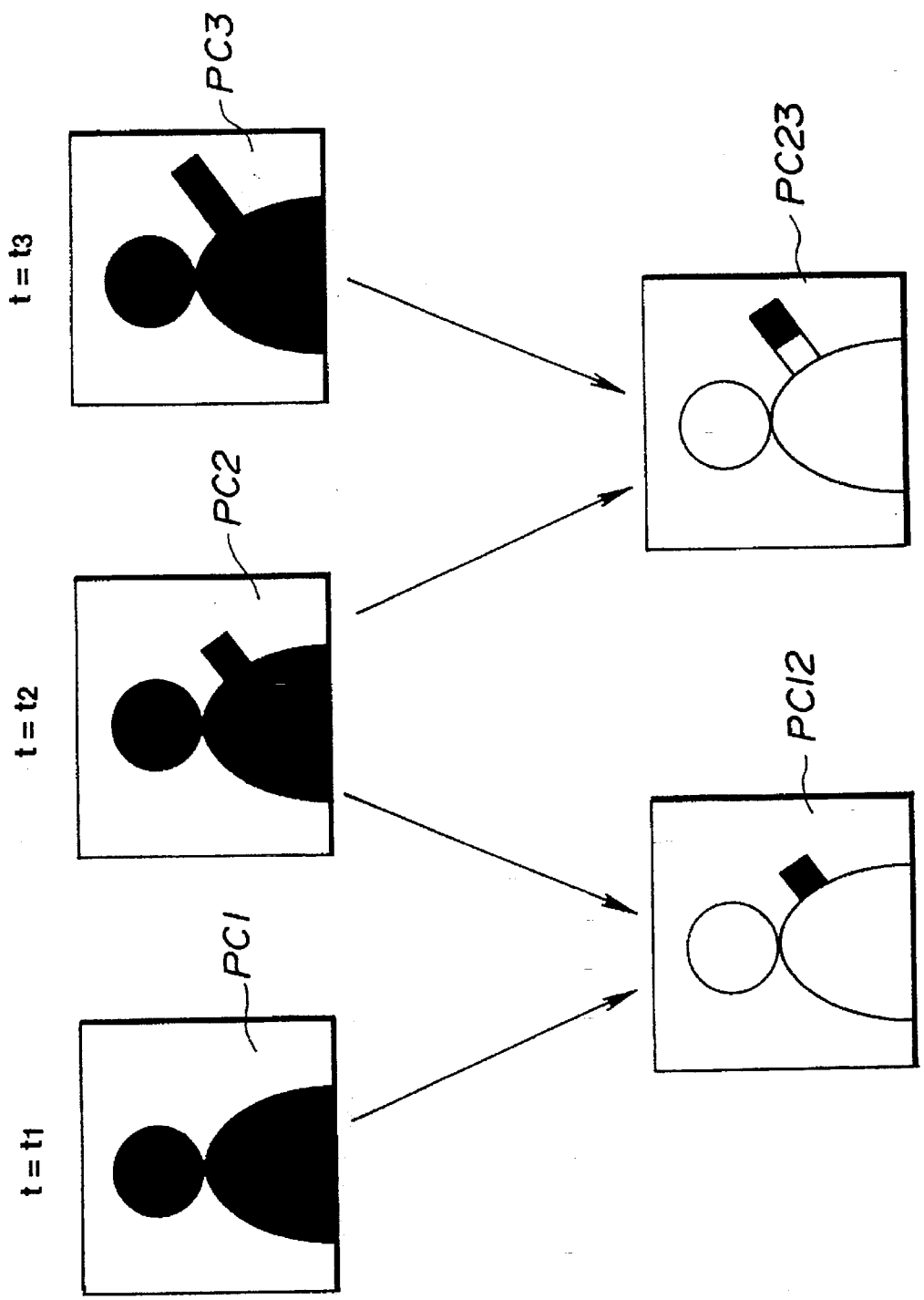

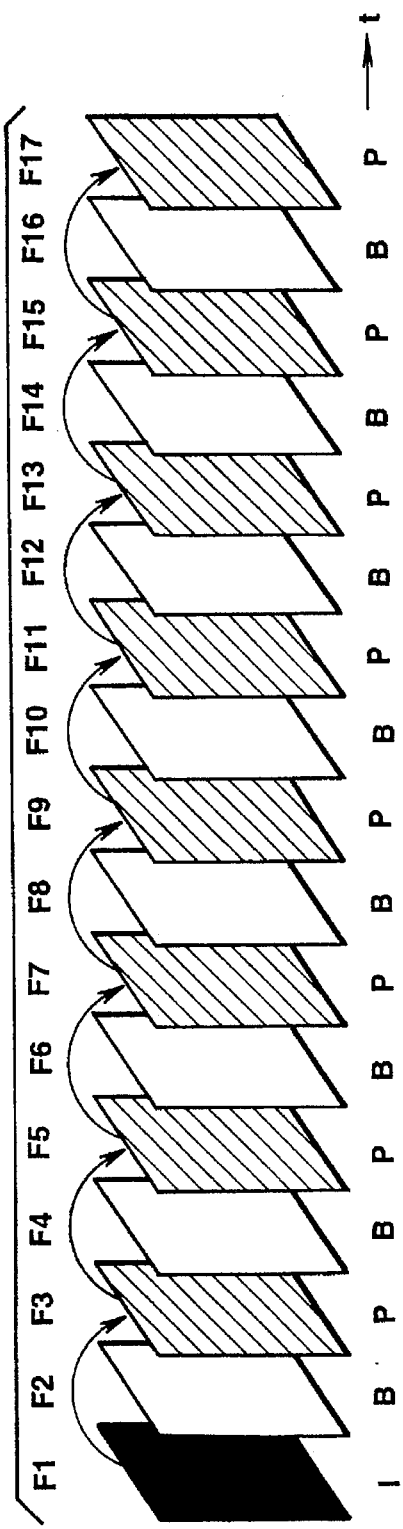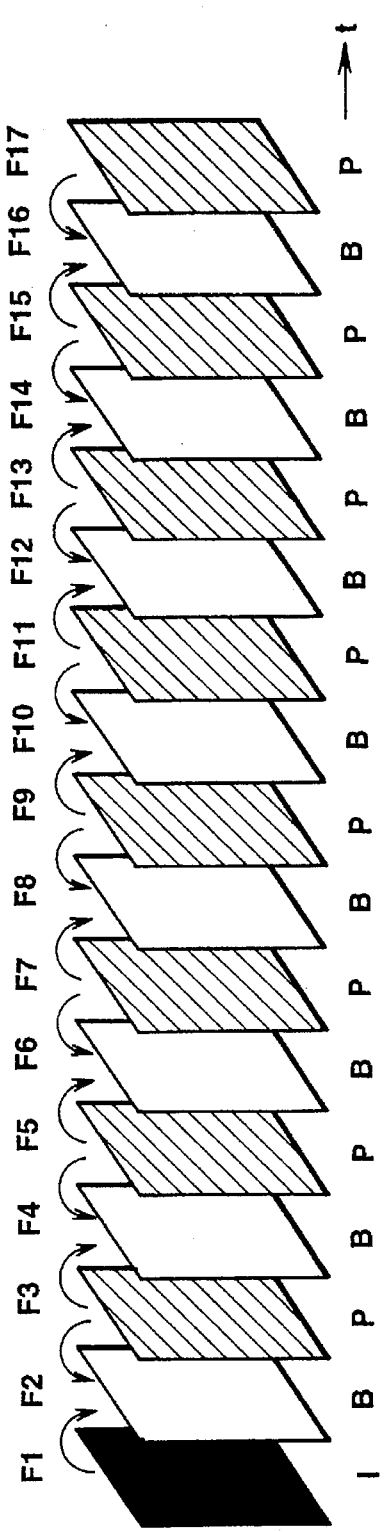
FIG.2A (PRIOR ART)
FIG.2B (PRIOR ART)

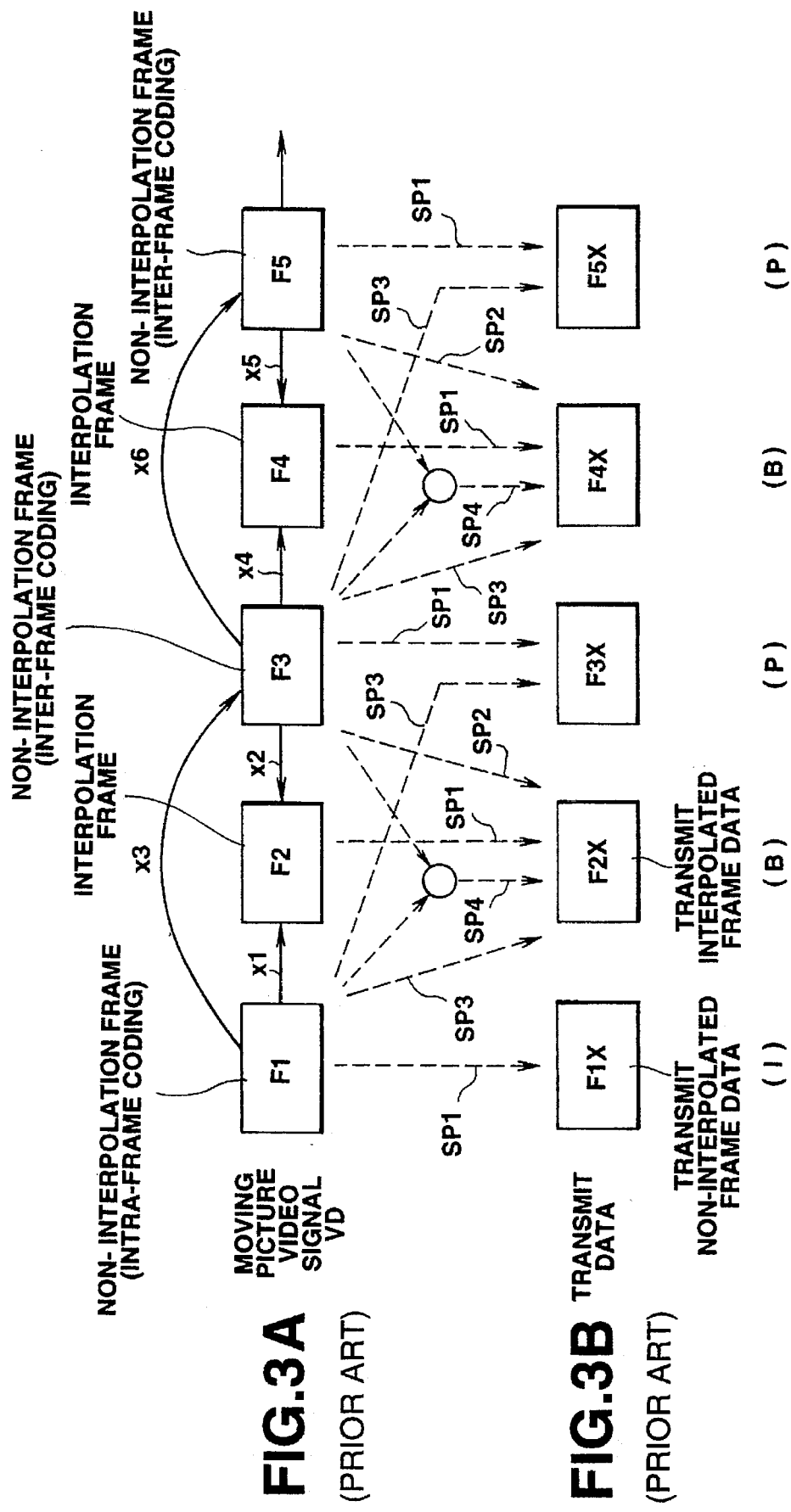

PICTURE SIGNAL REPRODUCING METHOD AND PICTURE SIGNAL REPRODUCING APPARATUS

TECHNICAL FIELD

This invention relates to a picture signal encoding method and a picture signal encoding apparatus, a picture signal decoding method and a picture signal decoding apparatus, and picture signal recording media suitable in the case of recording moving picture signals onto recording media, e.g., magneto-optical disc or magnetic tape, etc. to reproduce the recorded signals to display them on display, etc., or transmitting moving picture signals from the transmitting side to the receiving side through transmission path, etc. to receive the transmitted signals on the receiving side to display them as in television conference system, television telephone system or broadcasting equipment, etc.

BACKGROUND ART

In systems for transmitting moving picture signals to remote place, such as, for example, television conference system or television telephone system, etc., in order to efficiently utilize transmission path, picture signals are caused to be compression-coded by making use of line correlation or interframe correlation of video signal. As such compression encoding system, there are so called MPEG1 system and MPEG2 system (hereinafter encoding system including both systems will be called MPEG system).

When line correlation is utilized, picture signals are caused to undergo, e.g., DCT (Discrete Cosine Transform) processing, etc., thus making it possible to compress them.

Moreover, when interframe correlation is utilized, picture signals are caused to be further compressed, thus making it possible to encode them. When it is assumed that frame pictures PC1, PC2, PC3 respectively take place at times t1, t2, t3 as shown in FIG. 1A, for example, difference of picture signal between frame pictures PC1 and PC2 is calculated to generate PC12, and difference between frame pictures PC2 and PC3 is calculated to generate PC23, as shown in FIG. 1B.

Since pictures of frames adjacent in point of time ordinarily have not so great change, when difference therebetween is calculated, its difference signal takes small value. Accordingly, if such difference signal is encoded, code quantity can be compressed.

However, even if only difference signal is transmitted, it is impossible to restore (reconstruct) original picture. In view of this, in MPEG, pictures of respective frames are caused to be any ones of three kinds of I picture, P picture and B picture, thus to compression-encode picture signals.

Namely, as shown in FIGS. 2A and 2B, for example, picture signals of 17 frames of frames F1 to F17 are caused to be group of pictures, and this group of pictures is used as unit of processing. Picture signal of the leading frame F1 is encoded as I picture, the second frame F2 is processed as B picture, and the third frame F3 is processed as P picture. Further, the fourth frame and frames succeeding (subsequent) thereto which are labeled F4 and F17 are alternately processed as B picture and P picture.

As picture signal of I picture, picture signal of one frame is transmitted as it is. On the contrary, as picture signal of P picture, basically, difference from picture signal of I picture or P picture preceding thereto in point of time is transmitted as shown in FIG. 2(A). Further, as picture signal of B picture, basically, difference from mean value of both frames of frame preceding in point of time and frame succeeding in point of time is obtained as shown in FIG. 2(B) to encode its difference.

FIGS. 3A and 3B show the principle of method of encoding moving picture signal. As shown in the figure, since the first frame F1 is processed as I picture, it is transmitted to transmission path as transmit data F1X as it is (intra-frame coding). On the contrary, since the second frame F2 is processed as B picture, difference from mean value of frame F1 preceding in point of time and frame F3 succeeding in point of time is calculated, and the difference thus calculated is transmitted as transmit data F2X.

When further detailed explanation is given, there exist, in macro blocks, four kinds of processing as B picture as mentioned above. The first processing transmits data of original frame F2 as transmit data F2X as it is (SP1) (Intra Coding), and is a processing similar to the case in I picture. The second processing calculates difference from frame F3 succeeding in point of time to transmit its difference (SP2) (Backward Predictive Coding). The third processing transmits difference (SP3) from frame F1 preceding in point of time (Forward Predictive Coding). In addition, the fourth processing generates difference (SP4) from mean value of frame F1 preceding in point of time and frame F3 succeeding in point of time to transmit it as transmit data F2X (Bidirectionally Predictive Coding).

Among these four methods, a method in which quantity of data transmitted becomes minimum is adopted.

In this case, at the time of transmitting difference data, motion vector x1 with respect to picture (predictive picture) of frame subject to calculation of difference (motion vector between frames F1 and F2) (case of forward prediction), x2 (motion vector between frames F3 and F2) (case of backward prediction), or both x1 and x2 (case of bidirectional prediction) is or are transmitted along with difference data.

Moreover, with respect to frame F3 of P picture, with frame F1 preceding in point of time being as predictive picture, difference signal (SP3) between the frame F3 and the frame F1, and motion vector x3 are calculated, and they are transmitted as transmit data F3X (Forward Predictive Coding). Alternatively, data of original frame F3 is transmitted as transmit data F3X as it is (SP1) (Intra Coding). With respect to which method is employed in transmission, a method in which transmit data quantity becomes lesser is selected in macro block units similarly to the case of B picture.

FIG. 4 shows an example of the configuration of a system operative on the basis of the above-described principle so as to encode moving picture signal to transmit the coded signal to decode it. Coding unit 1 encodes inputted video signal to transmit it onto recording medium 3 as transmission path. Further, decoding unit 2 reproduces signal recorded on recording medium 3 to decode the reproduced signal to output it.

In the coding unit 1, inputted video signal is inputted to pre-processing circuit 11, at which it is separated into luminance signal and color signal (color difference signal in the case of this example). These signals are caused to respectively undergo A/D conversion by A/D converters 12, 13. Video signals converted into digital signals after undergone A/D conversion by A/D converters 12, 13 are delivered to frame memory 14, and are stored thereinto. Frame memory 14 allows luminance signal frame memory 15 to store luminance signal, and allows color difference signal frame memory 16 to store color difference signal.

Format converting circuit 17 converts signal of frame format stored in frame memory 14 into signal of block format. Namely, as shown in FIG. 5, video signal stored in frame memory 14 is caused to be data of frame format in which V lines comprised of H dots per each line are gathered. Format converting circuit 17 divides signal of one frame into M slices with 16 lines being as a unit.

Each slice is divided into M macro blocks. Each macro block consists of luminance signals corresponding to 16×16 pixels (dots). This luminance signal is further divided into blocks Y [1] to Y [4] having 8×8 dots as unit. Cb signal of 8×8 dots and Cr signal of 8×8 dots are caused to correspond to luminance signal of 16×16 dots.

Data converted into block format in this way is delivered from format converting circuit 17 to encoder 18, at which encode (encoding) operation is carried out. Since the detail thereof does not affect the subject matter of this invention, its explanation is omitted here.

Signal encoded by encoder 18 is outputted to transmission path as bit stream, and is recorded onto, e.g., recording medium 3.

Data reproduced from the recording medium 3 is delivered to decoder 31 of decoding unit 2, at which such data is decoded. Since the detail of decoder 31 does not affect the subject matter of this invention, its explanation is omitted here.

Data decoded by decoder 31 is inputted to format converting circuit 32, at which it is converted from block format to frame format. Luminance signal of frame format is delivered to luminance signal frame memory 34 of frame memory 33, and is stored thereinto. Color difference signal is delivered to color difference signal frame memory 35, and is stored thereinto. Luminance signal and color difference signal which have been read out from luminance signal frame memory 34 and color difference signal frame memory 35 are caused to respectively undergo D/A conversion by D/A converters 36 and 37, and are then delivered to post-processing circuit 38, at which they are synthesized. Synthesis output thus obtained is outputted to display, e.g., CRT (not shown), etc., and is displayed thereon.

There are instances where coded moving picture signals (bit streams) are transmitted from, e.g., antenna of broadcasting station, and there are also instances where such coded moving picture signals are recorded onto recording media such as digital VTR/digital video disc, etc.

System for recording/reproducing such coded moving picture signals (bit streams) is constituted as shown in FIG. 6, for example, in the prior art. Digital VTR recording/reproducing unit 51 reads out bit stream recorded on digital VTR to decode it to output video/audio signal. Digital video disc unit 52 reads out bit stream recorded on digital video disc to decode it to output video/audio signal. Digital TV receiving tuner 53 receives bit stream which has been transmitted as radio wave to decode it to output video/audio signal.

Video/audio signals outputted from these units are inputted to monitor 54. This monitor 54 is comprised of display, e.g., CRT, etc. to switch input source by using switch, etc., thereby making it possible to display moving picture signal from specified (designated) moving picture reproducing unit.

Moreover, in the case where moving picture signal received by, e.g., digital TV receiving tuner 53 is recorded by digital VTR recording/reproducing unit 51, video/audio signal that digital TV receiving tuner 53 outputs is inputted to digital VTR recording/reproducing unit 51. This digital VTR recording/reproducing unit 51 encodes inputted video/audio signal to write it onto recording media in the form of bit stream.

In the case where such a moving picture reproducing system is constituted as shown in FIG. 6 to connect a plurality of moving picture reproducing units to, e.g., one moving picture display unit to utilize source that user wants to see by selection of switch, decoding units for bit streams are respectively required in reproducing units connected to the system. Since encoding/decoding methods for bit stream are being standardized over the world by system such as MPEG, etc., these decoding units are of entirely the same structure. Accordingly, such system requires decoding units by the number of reproducing units are required, and is disadvantageous in terms of cost.

Furthers in the case where, e.g., moving picture signal reproduced by a certain moving picture reproducing unit is recorded by different moving picture recording unit, signal once decoded is encoded for a second time and is then recorded. Also in this case, it is sufficient that bit steam before subjected to decoding and bit stream after undergone encoding are the same. Accordingly, this system additionally requires encoding unit or units and is therefore disadvantageous in terms of cost. In addition, degradation of picture quality by encoding becomes problem.

DISCLOSURE OF THE INVENTION

This invention has been made in view of such circumstances, monitor side is caused to have decoding unit portion for bit stream to link (connect) reading unit for bit stream, decoding unit portion for bit stream and recording unit portion for bit stream by means of digital network, thereby contemplating permitting reduction of cost.

(1) While, in the conventional moving picture recording/reproducing system, bit stream decoder was assembled in each reproducing apparatus (unit) and moving picture encoder was assembled in each recording apparatus (unit), moving picture recording/reproducing system according to this invention is of a structure in which monitor side is caused to have bit stream decoder. Reproducing unit is caused to have only function as a unit for reproducing bit stream as it is and recording unit is caused to have only function as a unit for recording bit stream as it is. Bit stream reproducing unit and bit stream decoder (decoding unit) on the monitor side, and such reproducing unit and bit stream recording unit are linked (coupled) by means of high speed digital network.

(2) When respective units are connected by means of digital network, there occurs the possibility that delay peculiar to the digital network may take place. For this reason, network transmitting buffer is provided at the bit stream reading unit side, and network receiving buffer is provided at the bit stream decoding unit side and the bit stream recording unit side.

(3) In this instance, in the case where bit streams recorded on storage media to be reproduced are variable rate, a picture signal decoding method described in this invention is directed to a method of reading out bit stream from recording media on which coded picture signals are contained (recorded) to decode that bit stream to reproduce picture signal, wherein unit for decoding bit stream monitors data remaining quantity of buffer to send a signal of bit stream transmit/transmit interrupt signal through digital network by that remaining quantity. Unit for reading out bit stream receives that signal through digital network to switch bit stream transmit/transmit interrupt by that signal.

Moreover, a picture signal decoding method described in this invention is directed to a method of reading out bit stream from recording media on which coded picture signals are contained (recorded) to decode that bit stream to reproduce picture signal, wherein unit for reading out bit stream carries out local decode operation with respect to a portion of bit streams which have been read out to take out timing information where that bit stream is displayed to intermittently transmit bit stream to digital network on the basis of that timing information.

(1) In the case where there is constructed such a moving picture recording/reproducing system to connect a plurality of moving picture reproducing units to, e.g., one moving picture display unit (decoders) to utilize source desired to see by selection of switch, in accordance with the conventional method, bit stream decoding units having the same function were required by the number of moving picture reproducing units, and moving picture encoding units having the same function were required by the number of moving picture recording units. On the contrary, in the moving picture recording/reproducing system according to this invention, moving picture display unit side is caused to have bit stream decoding unit (decoder) to connect bit stream reading unit(s), bit stream decoding unit (decoder) and bit stream recording unit(s) by means of digital network. Accordingly, it is sufficient to provide only one bit stream decoding unit (decoder) on the moving picture display unit side. Thus, cost for bit stream decoding unit(s) and/or bit stream encoding unit(s) can be reduced.

(2) In this instance, in the case where bit stream to be read out is bit stream of variable rate, bit stream reading unit is required to transmit (send out) a suitable quantity of bit streams to digital network so that buffer of bit stream decoding unit (decoder) side does not overflow or underflow.

In connection with this, unit (decoder) for decoding bit stream monitors data remaining quantity of buffer to send bit stream transmit/transmit interrupt signal through digital network by that remaining quantity. Unit for reading out bit stream receives that signal through digital network to switch bit stream transmit/transmit interrupt by that signal, or unit for reading out bit stream takes out timing information where bit stream is displayed from bit stream which has been read out to intermittently transmit bit streams to digital network on the basis of that timing information. Thus, it is possible to cope with bit stream of variable rate.

BRIEF DESCRIPTION OF THE DRAWINGS

FIGS. 1A and 1B are views which explain the principle of efficient coding.

FIGS. 2A and 2B are views which explain the type of picture in the case where picture data is compressed.

FIGS. 3A and 3B are views which explain the principle for encoding moving picture signal.

FIG. 18 is a second example of the configuration of system in reproducing bit stream of variable bit rate in moving picture signal recording/reproducing system of this invention.

BEST MODE FOR CARRYING OUT THE INVENTION (1) Embodiment 1

Figure 4:
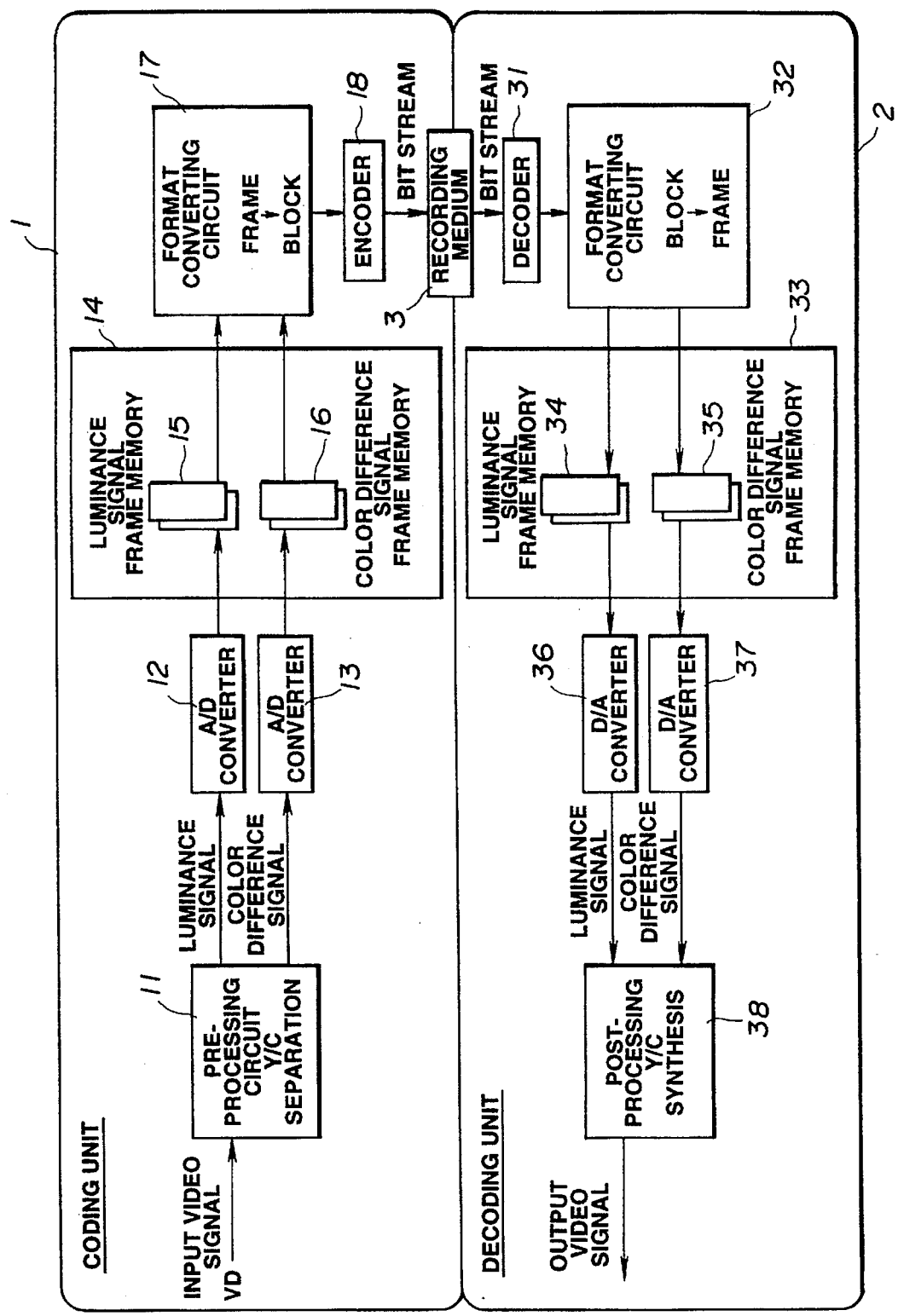
FIG. 4 is a block diagram showing an example of the configuration of conventional picture signal coding and decoding apparatuses (units).
Figure 5:
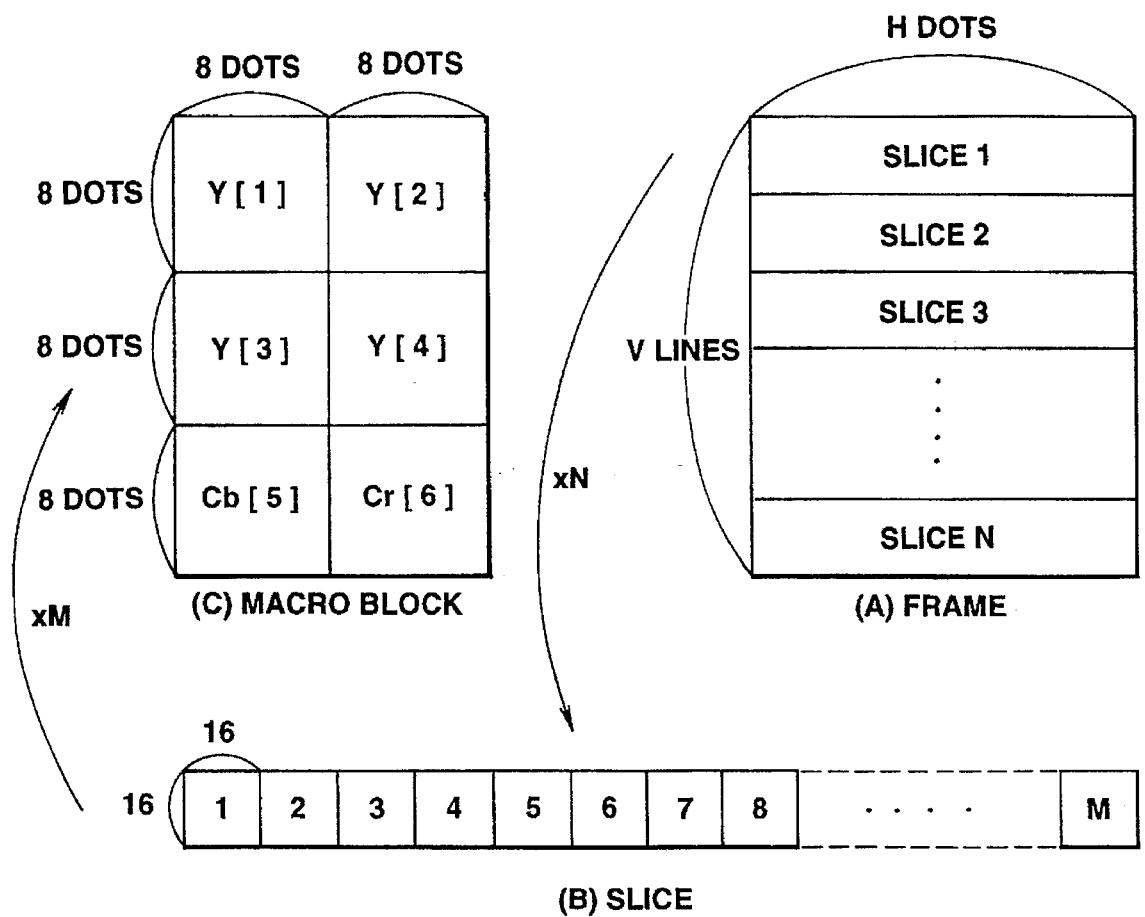
FIG. 5 is a view for explaining the operation of format conversion of format converting circuit 17 in FIG. 4.
Figure 6:
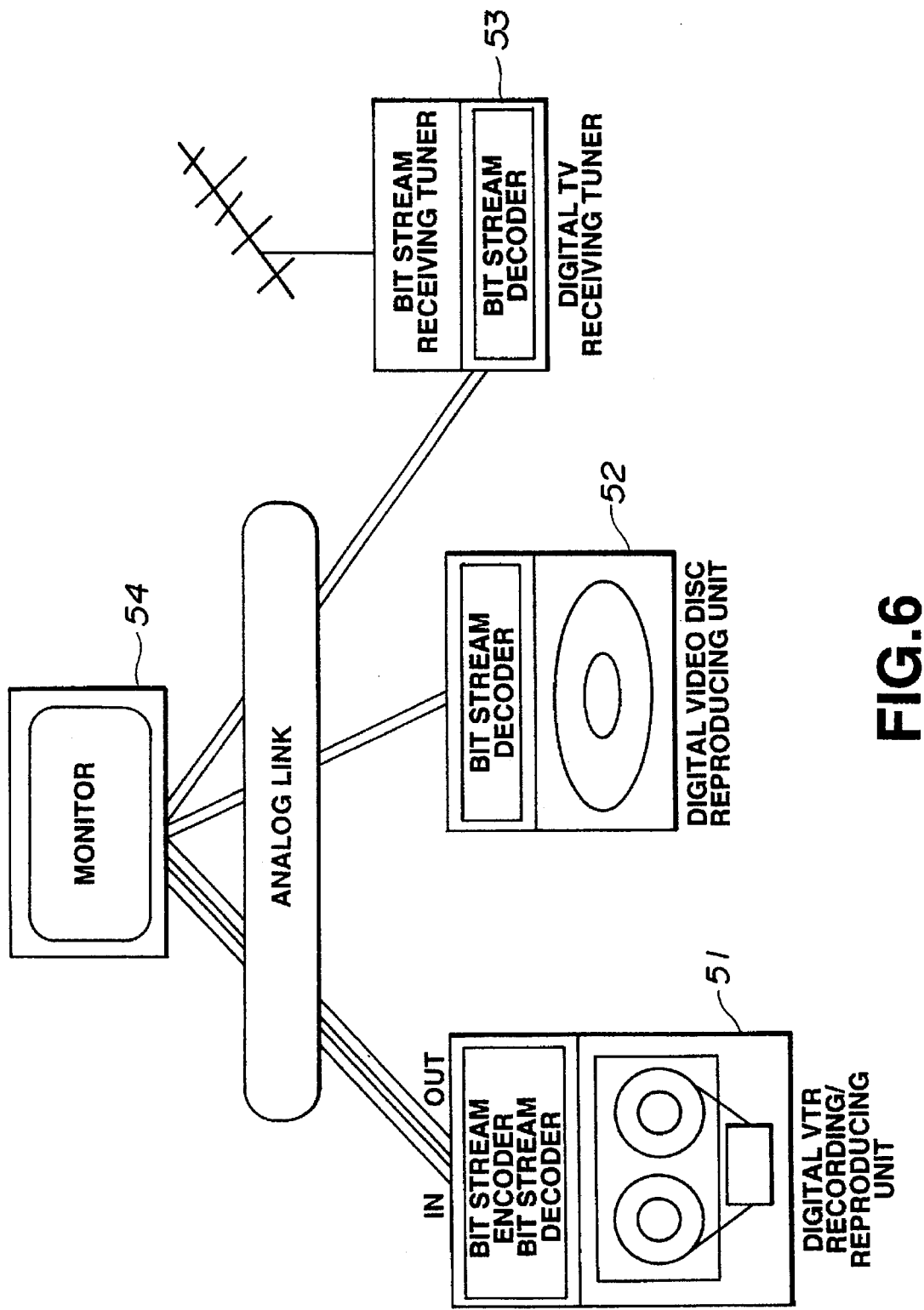
FIG. 6 is an example of the configuration of conventional moving picture signal recording/reproducing system.
Figure 7:
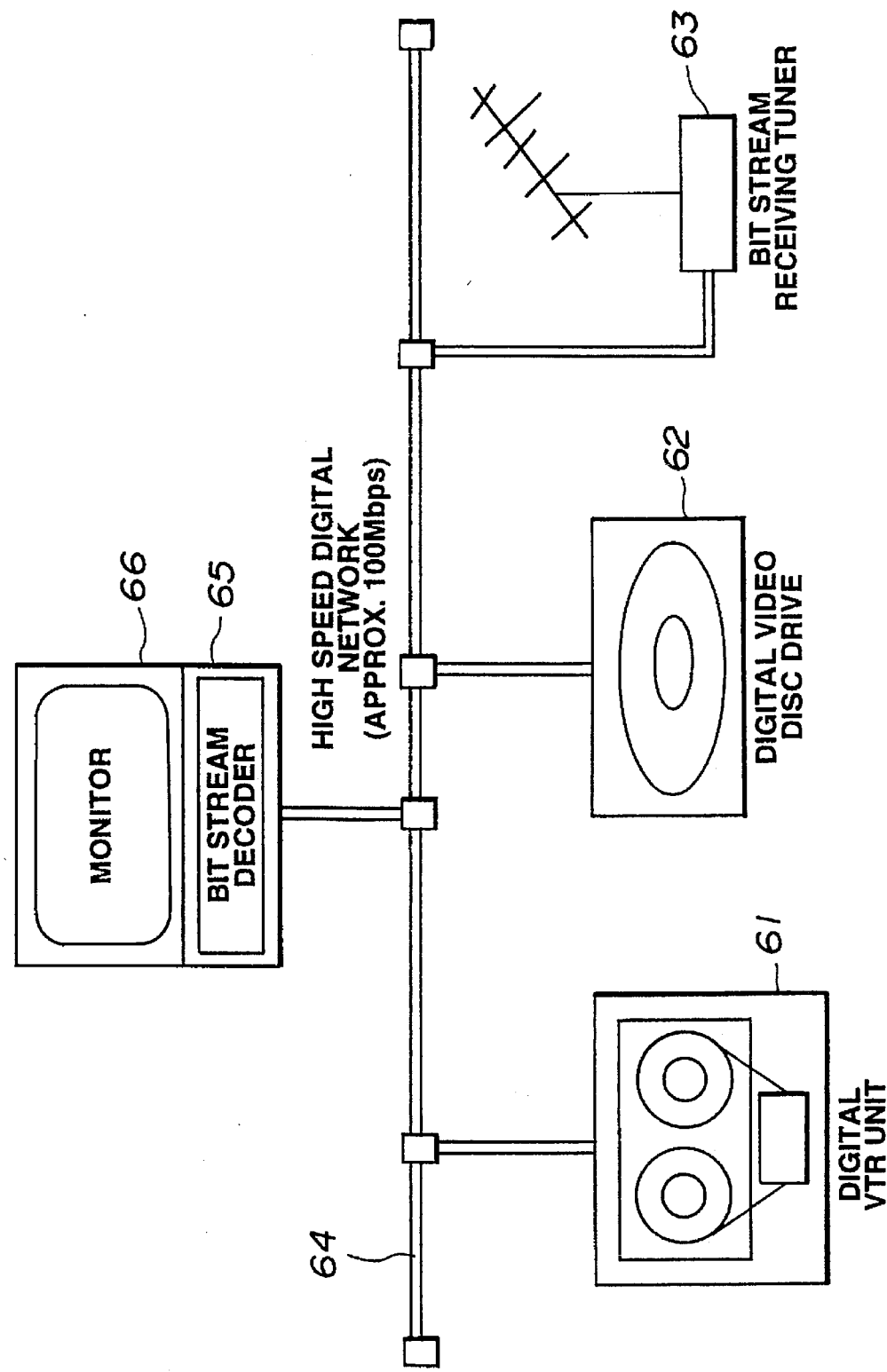
FIG. 7 is an example of the configuration of moving picture signal recording/reproducing system of this invention.

An example of the configuration of moving picture recording/reproducing system according to this invention is shown in FIG. 7.

Figure 8:
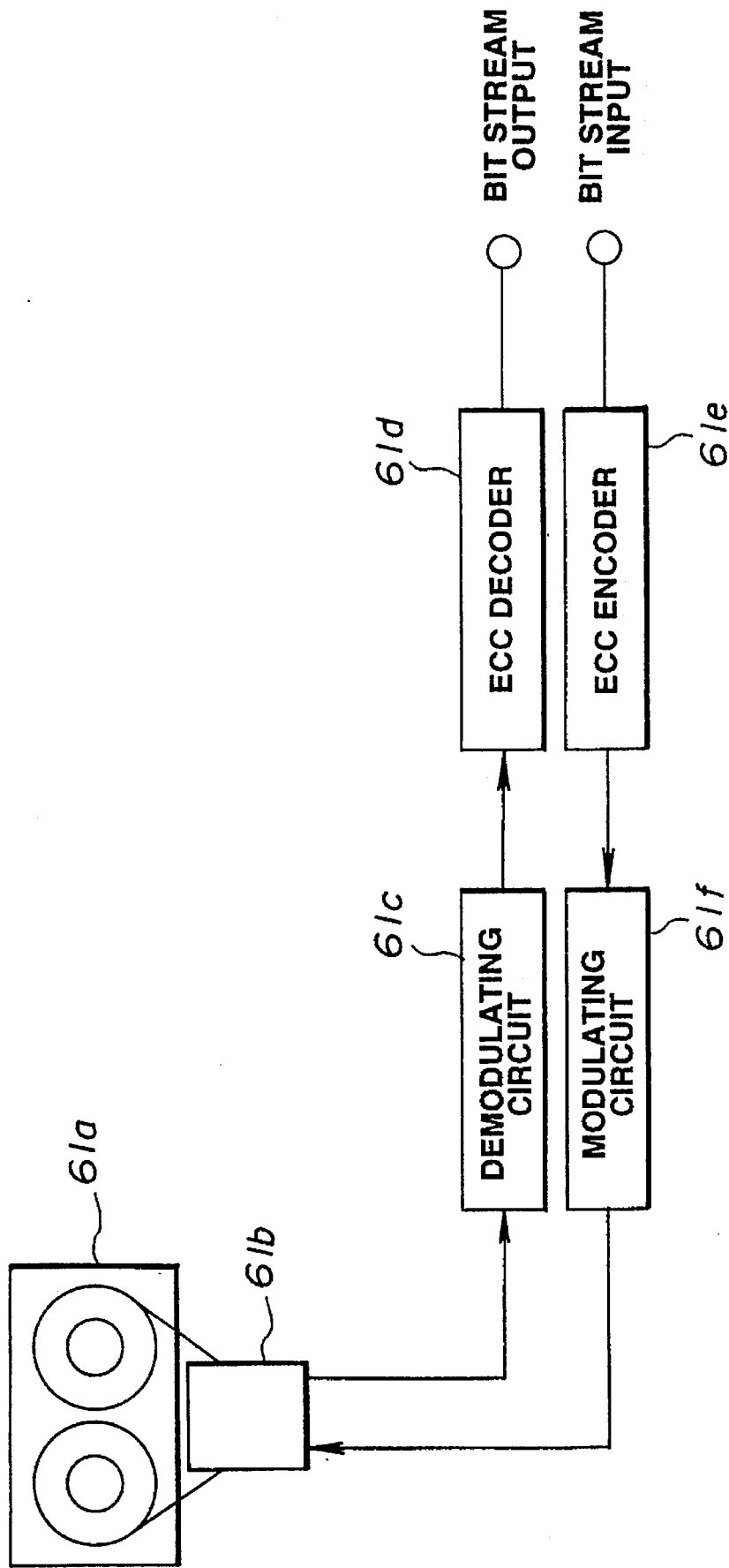
FIG. 8 is a block diagram showing an example of the configuration of digital VTR unit in this invention.

Digital VTR unit 61 has only function to read out bit streams recorded on digital VTR, and transmits bit stream which has been read out from digital VTR to digital network 64. An example of the configuration of digital VTR unit 61 is shown in FIG. 8.

Initially, magnetic head 61b reads out recorded data from digital video tape 61a. In order to allow bit stream to have error correction ability, redundant information for error correction is added thereto by any method. Further, in order to carry out conversion into data train suitable for recording media, the bit stream is modulated and is then recorded.

Accordingly, data which has been read out from digital video tape 61a is first demodulated at demodulating circuit 61c, and is caused to further undergo error correction by error correcting circuit (ECC decoder) 61d. Thus, desired bit stream results. This bit stream serves as output data from digital VTR unit 61.

Moreover, in the case of carrying out recording of bit streams by using digital VTR unit 61, data is recorded by a procedure opposite to the above. Information for error correction is added to inputted bit stream by means of ECC encoder 61e. Modulating circuit 61f applies modulation to this data to convert data train into data train suitable for recording media. Magnetic head 62b records this data train onto digital video tape 61a.

Figure 9:
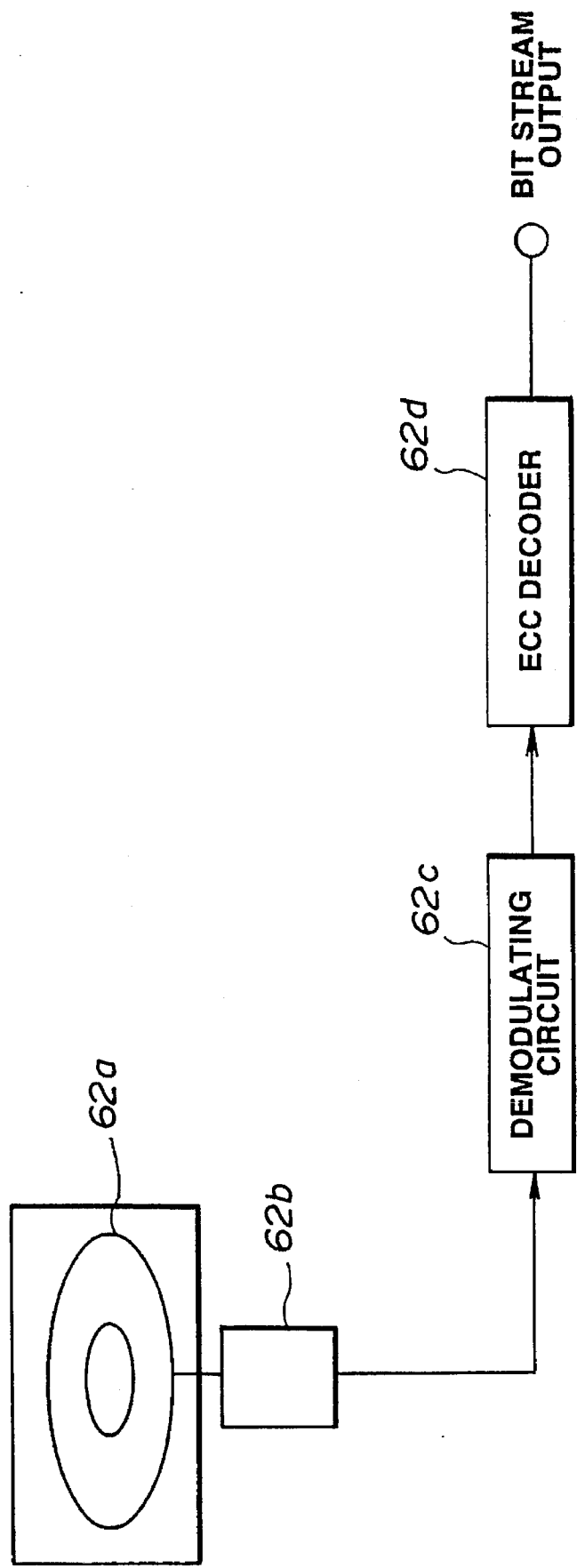
FIG. 9 is a block diagram showing an example of the configuration of digital video disc drive in this invention.

Digital video disc drive 62 only has function to read out bit streams recorded on digital video disc, and transmits bit stream which has been read out from digital video disc to digital network 64. An example of the configuration of digital video disc drive 62 is shown in FIG. 9.

Initially, optical pick-up 62b reads out recorded data from digital Video disc 62a. In order to allow bit stream to have error correction ability, redundant information for error correction is added thereto by any method. Further, in order to carry out conversion into data train suitable for recording media, the bit stream is modulated and is then recorded.

Accordingly, data which has been read out from digital video disc 62a is first demodulated at demodulating circuit 62c and is caused to further undergo error correction by means of error correcting circuit (ECC decoder) 62d. Thus, desired bit stream results. This bit stream serves as output data from digital video disc drive 62.

Figure 10:
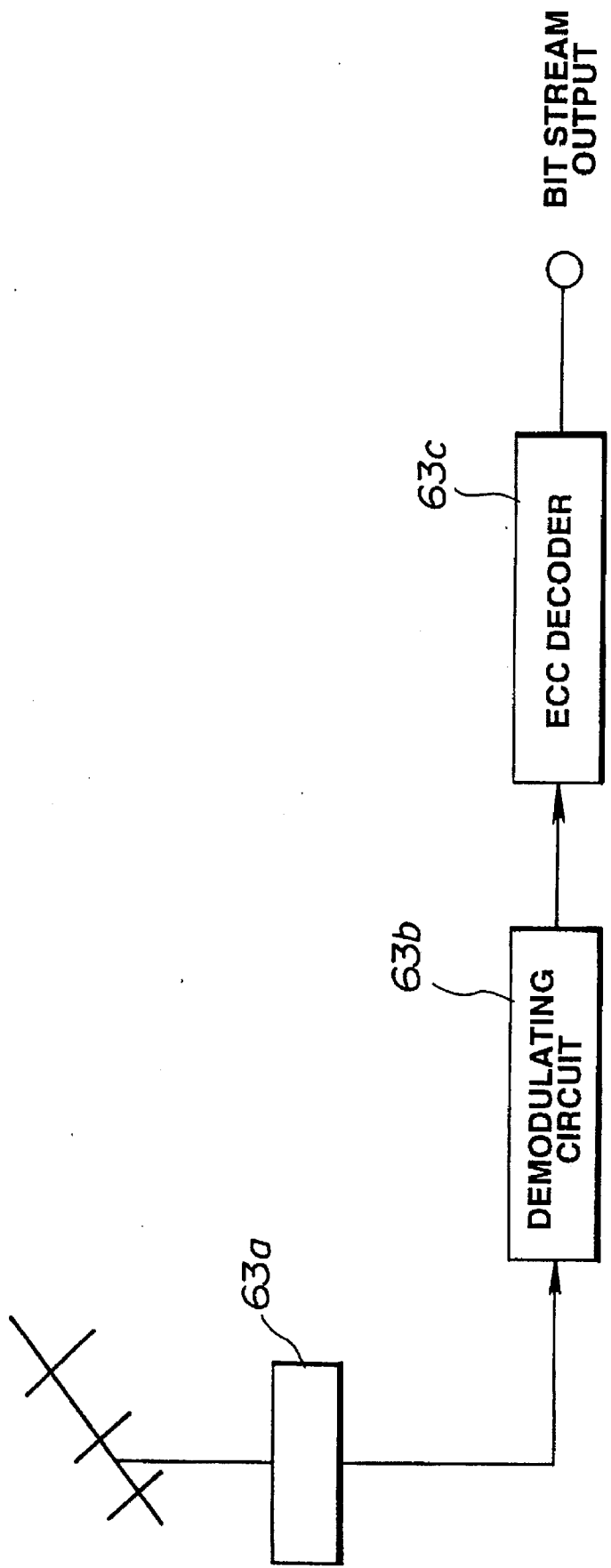
FIG. 10 is a block diagram showing an example of the configuration of bit stream receiving tuner in this invention.

Bit stream receiving tuner 63 receives bit stream which has been transmitted as radio wave to transmit the received bit stream to digital network 64. An example of the configuration of bit stream receiving tuner is shown in FIG. 10.

Initially, receiver 63a receives, by means of antenna, radio wave transmitted thereto to obtain digital data train. In order to allow bit stream to have error correction ability, redundant information for error correction is added thereto by any means. Further, in order to carry out conversion into data train suitable for radio wave to be transmitted, the bit stream is modulated.

Accordingly, data train which has been received by receiver 63a is demodulated at demodulating circuit 63b, and is caused to further undergo error correction by means of error correcting circuit (ECC decoder) 63c. Thus, desired bit stream results. This bit stream serves as output data from digital video disc drive 63 of bit stream receiving tuner 63.

Digital network 64 is a high speed digital network capable of carrying out communication at bit rate (e.g., 100 Mbps) sufficiently higher than maximum bit rate of bit stream.

Bit stream decoder 65 is a decoder for transforming bit stream which has been received from digital network 64 into moving picture signal, and is capable of selectively receiving, from digital network 64, bit stream reproduced from specific bit stream reproducing unit by using selector switch, etc.

Figure 11:
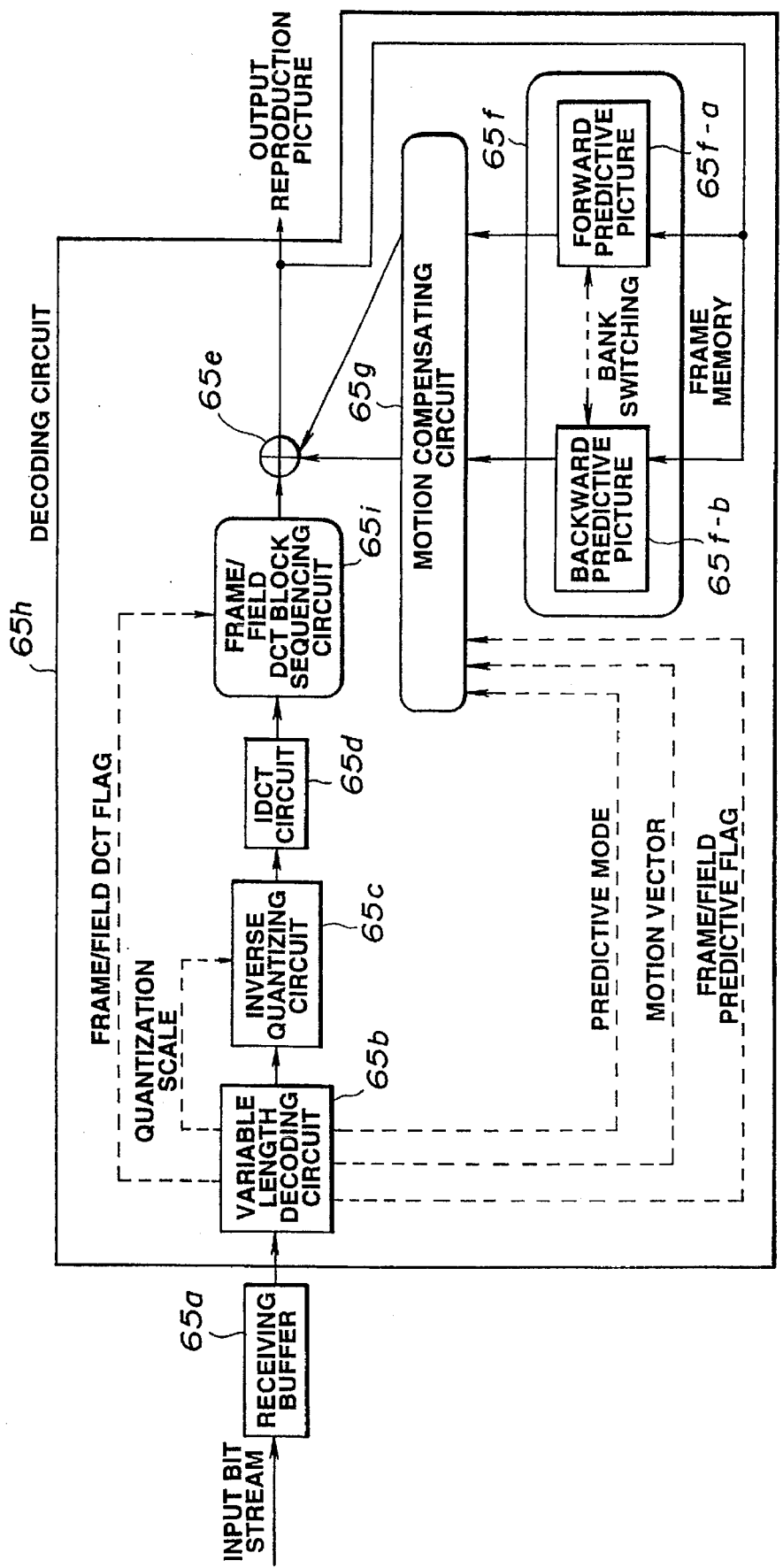
FIG. 11 is a block diagram of bit stream decoder in this invention.

An example of the configuration of bit stream decoder 65 is shown in FIG. 11. This is the example of a unit for decoding bit stream encoded by the worldwide standard method called MPEG2 described above.

Bit stream sent from digital network 64 is temporarily stored into receiving buffer 65a, and is then delivered to variable length decoding circuit 65b of decoding circuit 65h. The variable length decoding circuit 65b allows data delivered from receiving buffer 65a to undergo variable length decoding to output motion vector, predictive mode, predictive flag and DCT flag to motion compensating circuit 65g, to output quantization step to inverse quantizing circuit 65c, and to output decoded picture data to inverse quantizing circuit 65c.

The inverse quantizing circuit 65c inverse-quantizes picture data delivered from variable length decoding circuit 65b in accordance with quantization step similarly delivered from variable length decoding circuit 65b to output it to IDCT circuit 65d. Data (DCT coefficients) outputted from inverse quantizing circuit 65c is caused to undergo inverse DCT processing at IDCT circuit 65d, and is then delivered to operation element 65e. Sequencing circuit 65i implements sequencing processing to inverse-DCT processed coefficients in accordance with DCT flag delivered from variable length decoding circuit 65b so that they are in a predetermined order.

In the case where picture data delivered from IDCT circuit 65b is data of I picture, that data is outputted from operation element 65e. Further, such output data is delivered to forward predictive picture portion 65f-a of frame memory 65f in order to generate predictive picture data of picture data (data of P or B picture) inputted later to operation element 65e, and is stored thereinto.

In the case where picture data delivered from IDCT circuit 65d is data of P picture having picture data earlier by one frame as predictive picture data and is data of forward predictive mode, picture data (data of I picture) earlier by one frame, which is stored in forward predictive picture portion 65f-a of frame memory 65f, is read out. At motion compensating circuit 65g, motion compensation corresponding to motion vector outputted from variable length decoding circuit 65b is implemented thereto. In this example, motion compensating circuit 65g reads out picture data by frame structure or field structure from frame memory 65f in accordance with frame/field predictive flag outputted from variable length decoding circuit 65b.

At operation element 65e, the picture data which has been read out is added to picture data (data of difference) delivered from IDCT circuit 84, and added data is outputted. This added data, i.e., decoded data of P picture is delivered to backward predictive picture portion 65f-b of frame memory 65f and is stored thereinto in order to generate predictive picture data of picture data (data of B picture or P picture) inputted later to operation element 65e.

Even if corresponding data is data of P picture, data of intra frame predictive mode is not caused to particularly undergo processing at operation element 65e similarly to data of picture, and is stored into backward predictive picture portion 65f-b as it is.

Since this P picture is picture to be displayed subsequently to B picture, it is not yet outputted at this time point (P picture inputted subsequently to B picture is processed prior to B picture and is transmitted).

In the case where picture data delivered from IDCT circuit 65d is data of B picture, picture data of I picture (in the case of forward predictive mode) stored in forward predictive picture portion 65f-a of frame memory 85f, picture data of P picture (in the case of backward predictive mode) stored in backward predictive picture portion 65f-b, or both picture data thereof (in the case of bidirectional predictive mode) is or are read out in correspondence with predictive mode delivered from variable length decoding circuit 65b. At motion compensating circuit 65g, motion compensation corresponding to motion vector outputted from variable length decoding circuit 65b is implemented thereto. Thus, predictive picture is generated. It should be noted that in the case where no motion compensation is required (in the case of intra frame predictive mode), no predictive picture is generated. In this example, motion compensating circuit 65g reads out picture data by frame structure or field structure from frame memory 65f in correspondence with frame/field predictive flag outputted from variable length decoding circuit 65b.

Data to which motion compensation is implemented at motion compensating circuit 65g in this way is added to output of IDCT circuit 65d at operation element 65e.

It should be noted that since this added output is data of B picture and is not utilized for generation of predictive pictures of other pictures, it is not stored into frame memory 65f.

After picture of B picture is outputted, picture data of P picture stored in backward predictive picture portion 65f-b is read out and is delivered to operation element 65e through motion compensating circuit 65g. At this time, no motion compensation is carried out.

Monitor 66 is a display, e.g., CRT, etc. and displays moving picture signal sent from bit stream decoder 65.

(2) Embodiment 2 (Case where bit stream is constant (fixed) rate.

In the case where bit stream that bit stream reproducing unit transmits to digital network 64 is constant (fixed) bit rate as in the case of, e.g., digital VTR, bit stream reproducing unit carries out sending-out (transmission) of bit stream at that bit rate.

However, since bit stream reproducing unit or units, e.g., digital video disc, etc. is or are additionally connected to digital network 64, it cannot be said that digital network 64 is in utilizable state at all times. In the case where any other unit occupies digital network 64, even if bit stream reproducing unit reads out bit stream from recording media, etc., it is unable to immediately send out bit stream to digital network 64.

Moreover, also in bit stream decoding unit, for a time period during which unit except for bit stream reproducing unit that attempts to receive bit stream occupies digital network 64, it cannot receive bit stream, thus failing to carry out processing of decoding. For this reason, there is the possibility that buffer within decoder may underflow.

Figure 12:
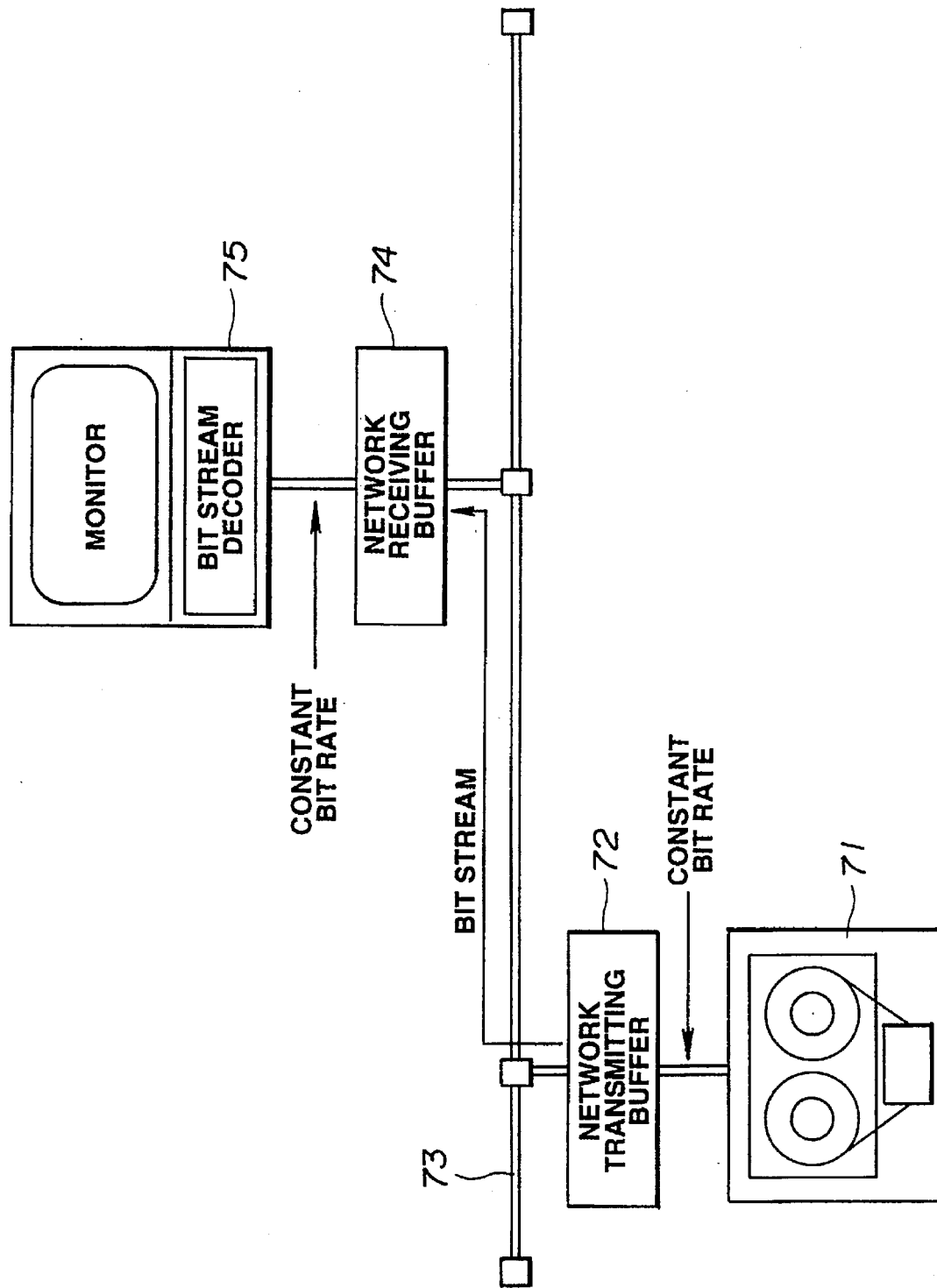
FIG. 12 is an example of the configuration of system in reproducing bit stream of constant (fixed) bit rate in moving picture signal recording/reproducing system of this invention.

An example of moving picture reproducing system having a function to solve such problems is shown in FIG. 12.

In this system, network transmitting buffer 72 and network receiving buffer 74 are respectively newly provided at the bit stream reading unit side and bit stream decoding unit side, thereby solving the above-mentioned problems.

Bit stream reading unit 71 reads out bit stream from recording media at a predetermined bit rate to send it to network transmitting buffer 72.

The network transmitting buffer 72 waits until there results the state where digital network 73 is not occupied by any other unit to transmit bit stream to digital network 73 as soon as the digital network 73 becomes empty.

Network receiving buffer 74 provided at the bit stream decoding side waits until bit stream transmitted from a predetermined bit stream reproducing unit is sent from digital network 73 to store The transmitted predetermined bit stream into buffer.

Bit stream decoder 75 reads out bit streams from network receiving buffer 74 at a predetermined bit rate to carry out decoding thereof.

Since digital network 73 can carry out communication at a bit rate sufficiently higher than maximum bit rate of bit stream, even in the case where arbitrary number of other bit stream reproducing units are connected to digital network 73, this system permits transmission and reception of bit streams without problem.

(3) Embodiment 3 (Case 1 where bit stream is variable rate)

In the case where bit stream that bit stream reproducing units sends out to digital network is variable bit rate, even if there is used system as shown in FIG. 12 in which buffer is prepared with respect to digital network, there occurs the problem that it is impossible to recognize bit rate in transmitting bit stream to digital network.

If speed when bit stream reproducing unit sends out bit stream to digital network is too high, according as bit streams are decoded, quantity of bit streams sent from digital network exceeds quantity of bit streams read out by bit stream decoder in network receiving buffer, and overflow may take place in due course of time.

In contrast, if speed when bit stream reproducing unit sends out bit stream to digital network is too law, according as bit streams are decoded, quantity of bit streams read out by bit stream decoder exceeds quantity of bit streams sent from digital network in network receiving buffer, and underflow may take place in due course of time.

Figure 13:
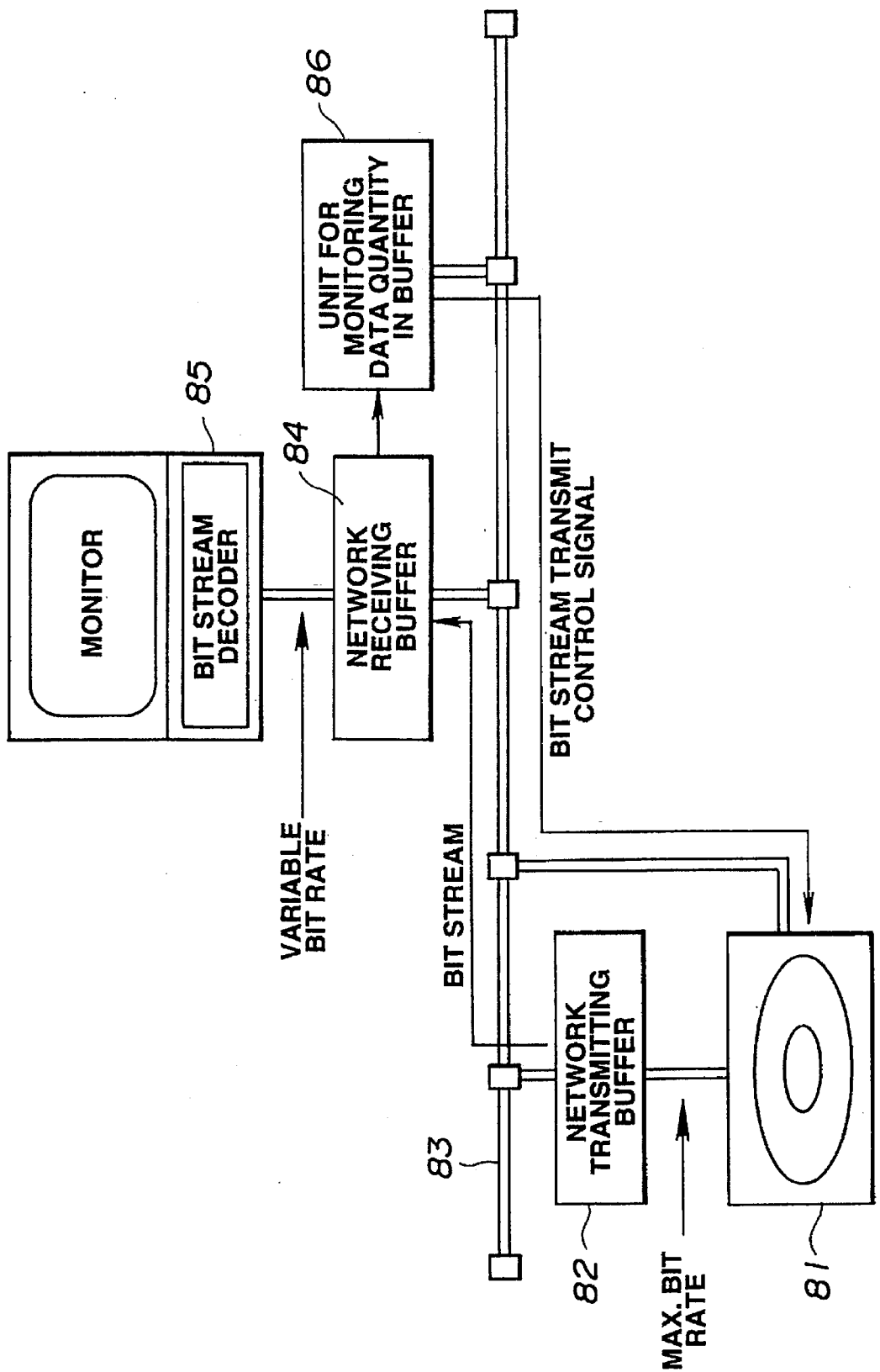
FIG. 13 is a first example of the configuration of system in reproducing bit stream of variable bit rate in moving picture signal recording/reproducing system of this invention.

An example of moving picture reproducing system having a function to solve such problems is shown in FIG. 13.

Bit stream reading unit 81 reads out bit stream from recording media at maximum bit rate to send it to network transmitting buffer 82.

The network transmitting buffer 82 waits until there results the state where digital network 83 is not occupied by any other unit to transmit bit stream to digital network 83 as soon as the digital network 83 becomes empty.

Network receiving buffer 84 provided at bit stream decoder side waits until bit stream transmitted from a predetermined bit stream reproducing unit is sent from digital network 83 to store the transmitted predetermined bit stream into buffer.

Bit stream decoder 85 reads out bit streams from network receiving buffer 84 as occasion demands while making reference to data remaining quantity of buffer provided within decoder to carry out decoding thereof.

In this case, since according as bit streams are decoded, quantity of bit streams sent from digital network 83 exceeds quantity of bit streams read out by bit stream decoder 85, if that state remains, network receiving buffer 84 may overflow in due course of time. In view of this, unit 86 for monitoring data quantity in buffer is newly provided to allow it to control transmission of data from bit stream reproducing unit 81, thereby coping with this problem.

The unit 86 for monitoring data quantity in buffer monitors data remaining quantity in network receiving buffer 84 to send a read-out interrupt/restart signal to bit stream reading unit 81 through digital network 83 so that network receiving buffer 84 does not overflow or underflow.

Responding to this signal, bit stream reading unit 81 carries out interruption/restart of read-out of bit streams.

Flow of this processing is shown in FIGS. 14–17.

Figure 14:
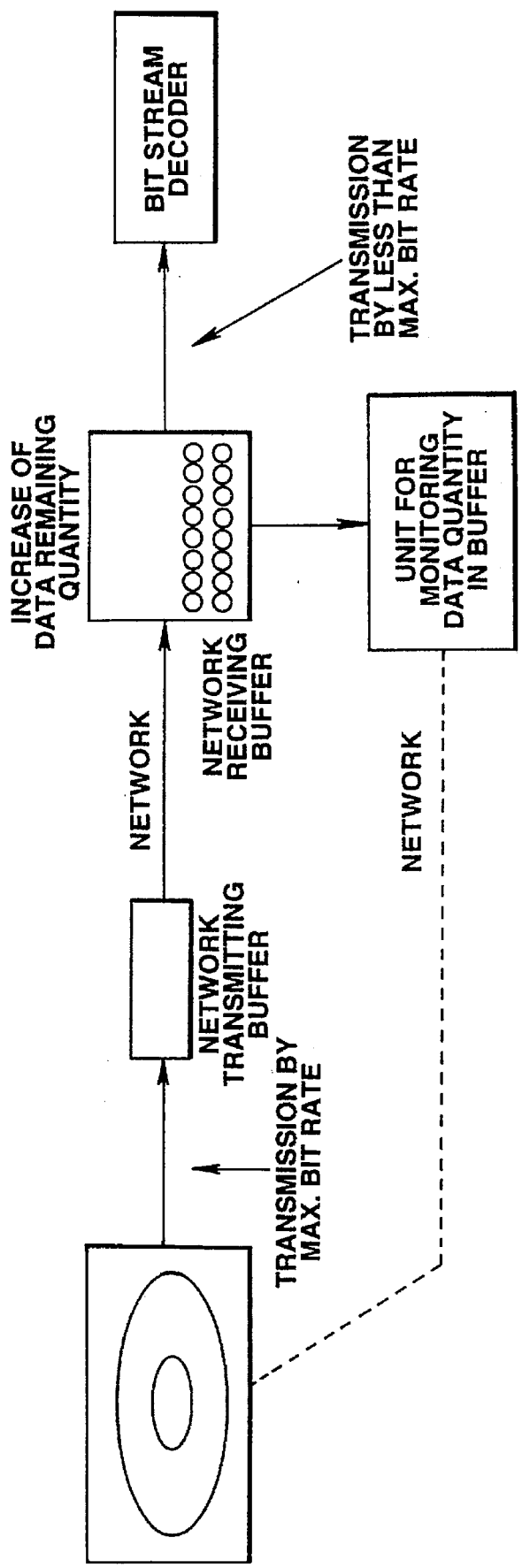
FIG. 14 is a view for explaining flow of operating state of network receiving buffer, unit for monitoring data quantity in buffer and bit stream reading unit in FIG. 13.

First, at the initial stage of reproduction of bit stream, data are not so much stored in network receiving buffer 84. However, since bit streams are transmitted at maximum bit rate from digital network 83, in the case where actual bit rate of bit stream is lower than maximum bit rate, read-in operation of bit streams in network receiving buffer 84 by bit stream decoder 85 does not come level with transmission speed of bit streams from digital network 83. As a result, data quantity in network receiving buffer 84 gradually increases (FIG. 14).

Figure 15:
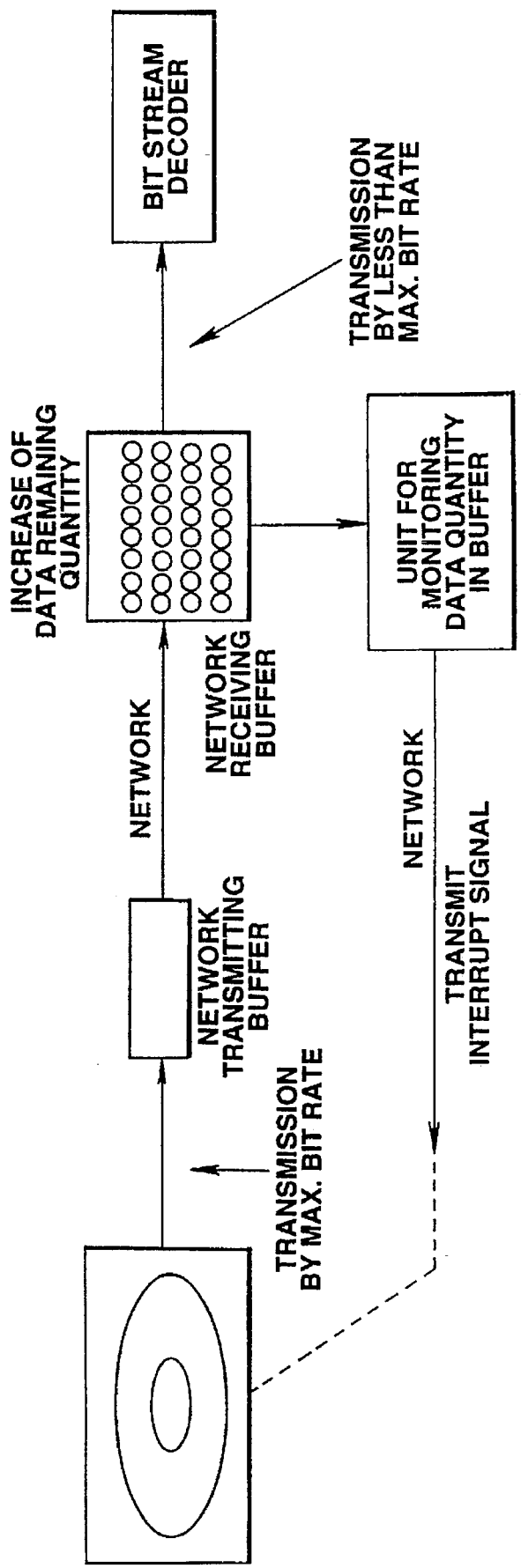
FIG. 15 is a view for explaining flow of operating state of network receiving buffer, unit for monitoring data quantity in buffer and bit stream reading unit.

If such state continues, data quantity in network receiving buffer 84 further increases, and network receiving buffer 84 attempts to overflow, unit 86 for monitoring data quantity in buffer transmits read-out interrupt signal to bit stream reading unit 81 through digital network 83 (FIG. 15).

Bit stream reading unit 81 which has received read-out interrupt signal from unit for monitoring data quantity in buffer interrupts read-out of bit streams. Thus, bit streams from digital network 83 are not transmitted to network receiving buffer 84. Of course, also during this time period, bit stream decoder 85 is carrying out decoding of bit streams. Followed by this, read-in of bit stream from network receiving buffer continues to be carried out.

Figure 16:
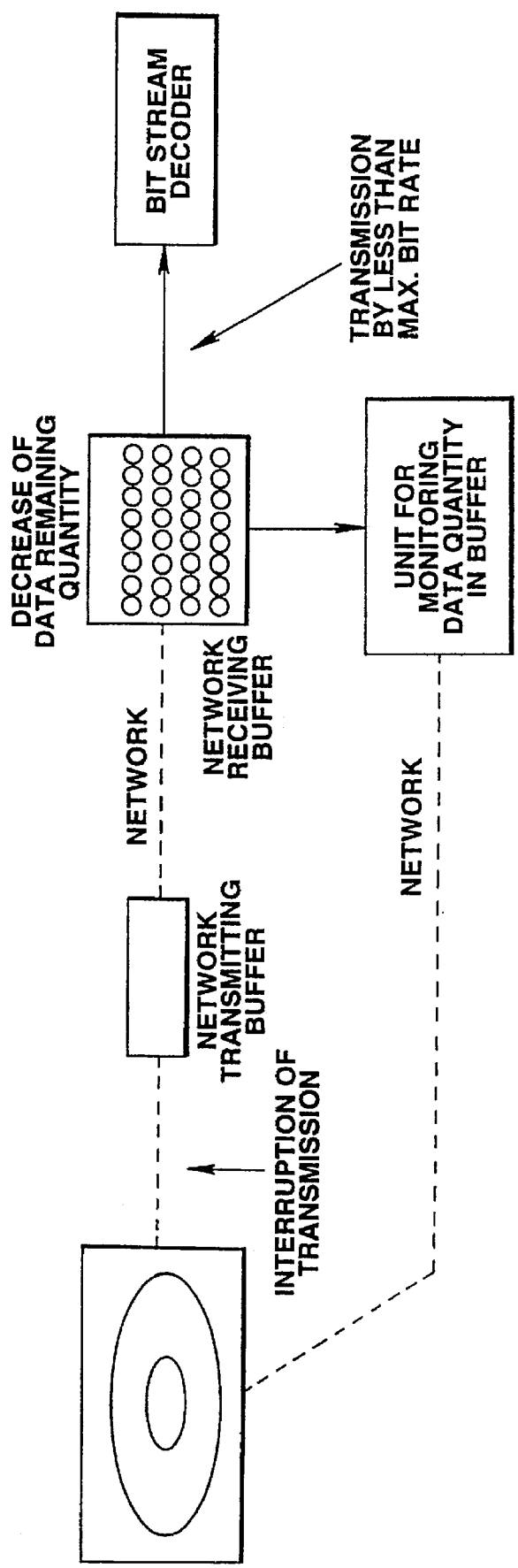

Accordingly, data quantity in network receiving buffer 84 begins decreasing (FIG. 16).

It should be noted that even if unit 86 for monitoring data quantity in buffer transmits read-out interrupt signal, there is the possibility that slight delay may take place in dependency upon the state of digital network 83 until that signal is transmitted (propagated) to bit stream reading unit 81.

Moreover, also after bit stream reading unit 81 interrupts read-out of bit streams, there is the possibility that data remaining in buffer may be transmitted to digital network 83 from network transmitting buffer 82 in dependency upon the state of digital network 83. For this reason, unit 86 for monitoring data quantity in buffer is required to send (transmit) read-out interrupt signal at early stage by taking it into consideration.

Figure 17:
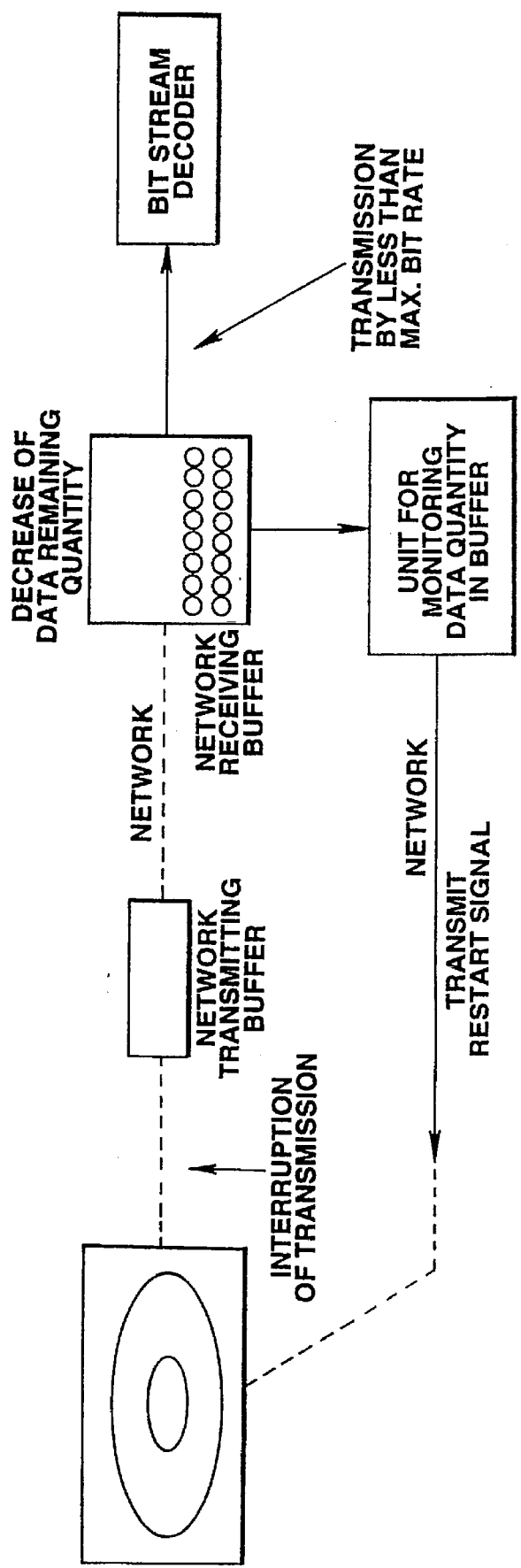
FIG. 17 is a view for explaining flow of operating state of network receiving buffer, unit for monitoring data quantity in buffer, and bit stream reading unit in FIG. 13.

If data quantity in network receiving buffer 84 becomes lesser in due course of time so that network receiving buffer 84 may attempt to underflow, unit 86 for monitoring data quantity in buffer transmits read-out restart signal to bit stream reading unit 81 through digital network 83 (FIG. 17).

Bit stream reading unit 81 which has received read-out restart signal from unit 86 for monitoring data quantity in buffer restarts read-out of bit streams. Thus, operation mode of this unit 86 returns to the state of FIG. 14 for a second time.

It should be noted that even if unit 86 for monitoring data quantity in buffer transmits read-out restart signal, there is the possibility that slight delay may take place in dependency upon the state of digital network 83 until that signal is actually transmitted (propagated) to bit stream reading unit 81.

Moreover, even after bit stream reading unit 81 restarts read-out of bit streams, there is the possibility that data may not be immediately sent (transmitted) to network receiving buffer 84 in dependency upon the state of digital network 83. For this reason, unit 86 for monitoring data quantity in buffer is required to sent read-out restart signal at an early stage by taking it into consideration.

In this way, unit 86 for monitoring data quantity in buffer controls transmission of bit streams, thereby making it possible to use bit streams of variable bit rate as well in this system.

(4) Embodiment 4 (Case 2 where bit stream is variable rate)

Figure 18:
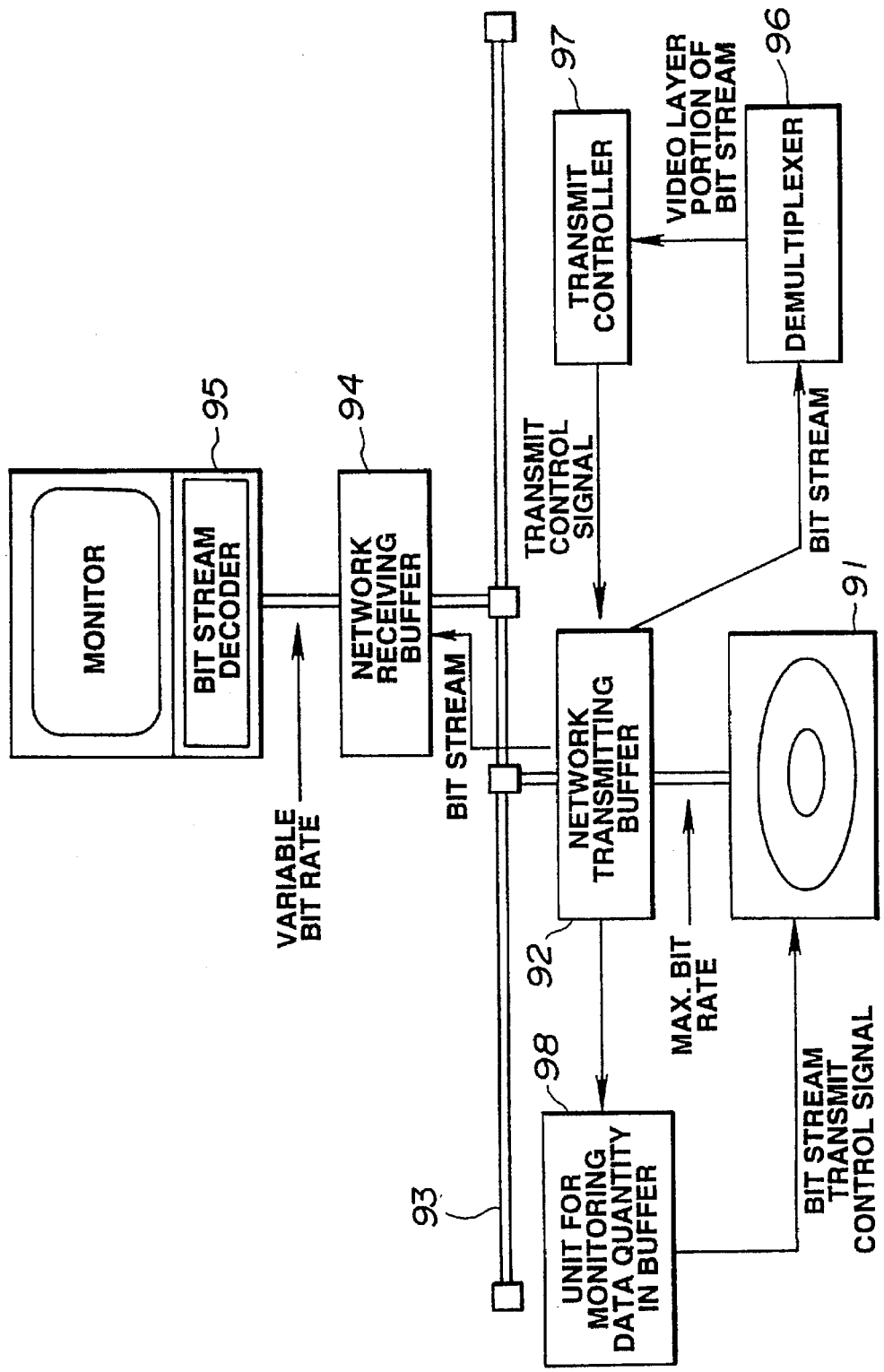
FIG. 18 is a view for explaining flow of operating state of network receiving buffer, unit for monitoring data quantity in buffer and bit stream reading unit in FIG. 13.

Another embodiment of moving picture reproducing system having a function to solve the problems described in the embodiment 3 is shown in FIG. 18.

Bit stream reading unit 91 reads out bit stream from recording media at maximum bit rate to send it to network transmitting buffer 92.

Local demultiplexer 96 reads out bit stream from network transmitting buffer 92 to carry out local demultiplexing. As a result, decoding of system layer positioned at the highest rank in structure of bit stream of MPEG. Thus, time stamp information buried in the system layer is obtained.

The time stamp information is parameter indicating timing at which bit stream of the portion where this time stamp information is buried is actually reproduced. In this embodiment, in encoding this time stamp information to record it onto recording media, it is necessary to write it at the leading portion of bit stream, e.g., every one frame.

Time stamp information is sent to transmit controller 97. The transmit controller 97 obtains, from local demultiplexer 96, time stamp information obtained every time bit streams of one frame are caused to undergo demultiplexing.

The transmit controller 97 allows network transmitting buffer 92 to first start transmission of bit stream of the first frame. Further, if the transmit controller 97 receives time stamp indicating the leading portion of the next frame, it sends transmit interrupt signal to network transmitting buffer 92.

If corresponding bit stream is a bit stream of display time of one frame, e.g., 30 frames per second after starting of transmission, the transmit controller 97 interrupts transmission of bit stream until time of ⅓₀ seconds is passed. After a predetermined time is passed, the transmit controller 97 sends signal of re-transmission of bit stream to restart transmission of bit stream.

Network transmitting buffer 92 responds to bit stream transmit command from transmit controller 97 to wait until there results the state where digital network 93 is not occupied by any other unit to transmit bit stream to digital network 93 as soon as the digital network 93 becomes empty.

For this reason, in network transmitting buffer 92, quantity of bit streams sent from bit stream reading unit 91 within unit time would exceed quantity of bit streams transmitted to digital network 93 within the same time. Accordingly, unit 98 for monitoring data quantity in buffer is provided.

Unit 98 for monitoring data quantity in buffer monitors data quantity in network transmitting buffer 92 to transmit read-out interrupt signal to bit stream reading unit 91 if overflow is about to take place. Thereafter, if network transmitting buffer 92 is about to underflow, unit 98 for transmitting data quantity in buffer transmits read-out restart signal to bit stream reading unit 91. Thus, data quantity in network transmitting buffer 92 is kept within a certain range.

Network receiving buffer 94 provided at the bit stream decoder side waits until bit stream transmitted from a predetermined bit stream reproducing unit is sent from digital network 93 to store the transmitted predetermined bit stream into buffer.

Bit stream decoder 95 reads out bit streams from network receiving buffer 94 as occasion demands while making reference to data remaining quantity of buffer provided within decoder to carry out decoding thereof.

Bit stream is variable bit rate. Moreover, among bit streams, there are complicated frames and simple frames. Therefore, it is impossible to recognize quantity of bit streams per each frame.

However, it is considered that even if quantity of bit streams becomes maximum, since digital network 93 can carry out communication at bit rate sufficiently higher with respect to maximum bit rate, time required for transmission of bit streams of one frame becomes sufficiently smaller than display time of one frame.

Figure 19:
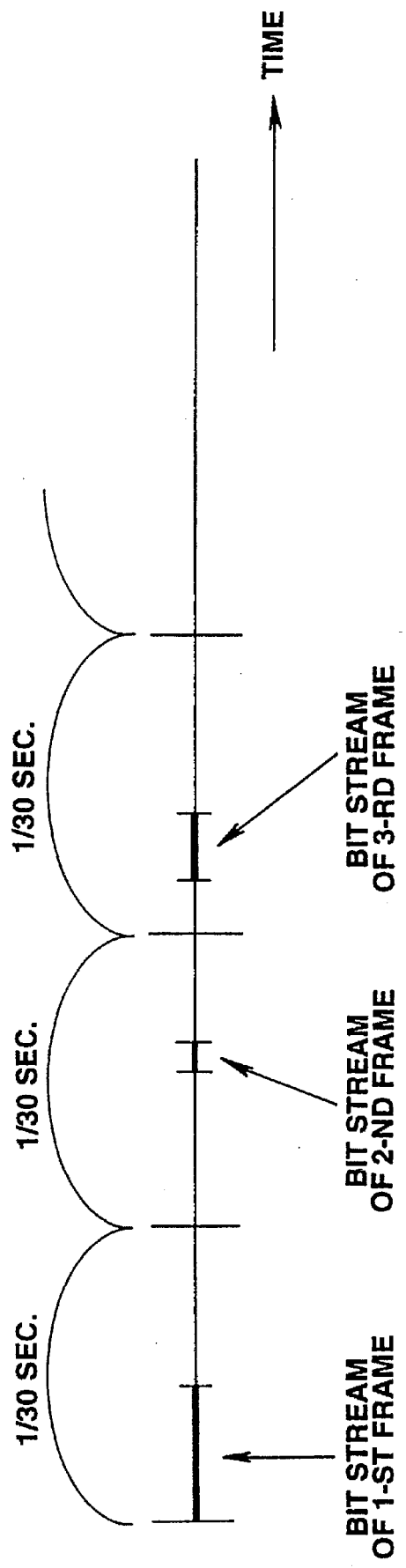
FIG. 19 is a view showing transmitting state of bit stream in digital network in the case of bit stream of 30 frames per second.

Accordingly, transmission of bit streams from network transmitting buffer 92 to digital network 93 is intermittently carried out every ⅓₀ seconds in the case of bit stream of, e.g., 30 frames per second. In this case, it is considered that transmitting state of bit streams within digital network 93 is as shown in FIG. 19.

Accordingly, in this system, since quantity of bit streams decoded in bit stream decoder 95 and quantity of bit streams transmitted from digital network 93 to network receiving buffer 94 are equal to each other per unit time, there is no possibility in network receiving buffer 94 that overflow/underflow may take place. Therefore, unit for monitoring data quantity in buffer of the bit stream decoder side as described in the embodiment 3 is not required.

Transmit controller 97 controls transmission of bit streams in this way, thereby making it possible to use bit streams of variable bit rate as well in this system.

(5) Embodiment 5 (Case 3 where bit stream is variable rate)

Figure 20:
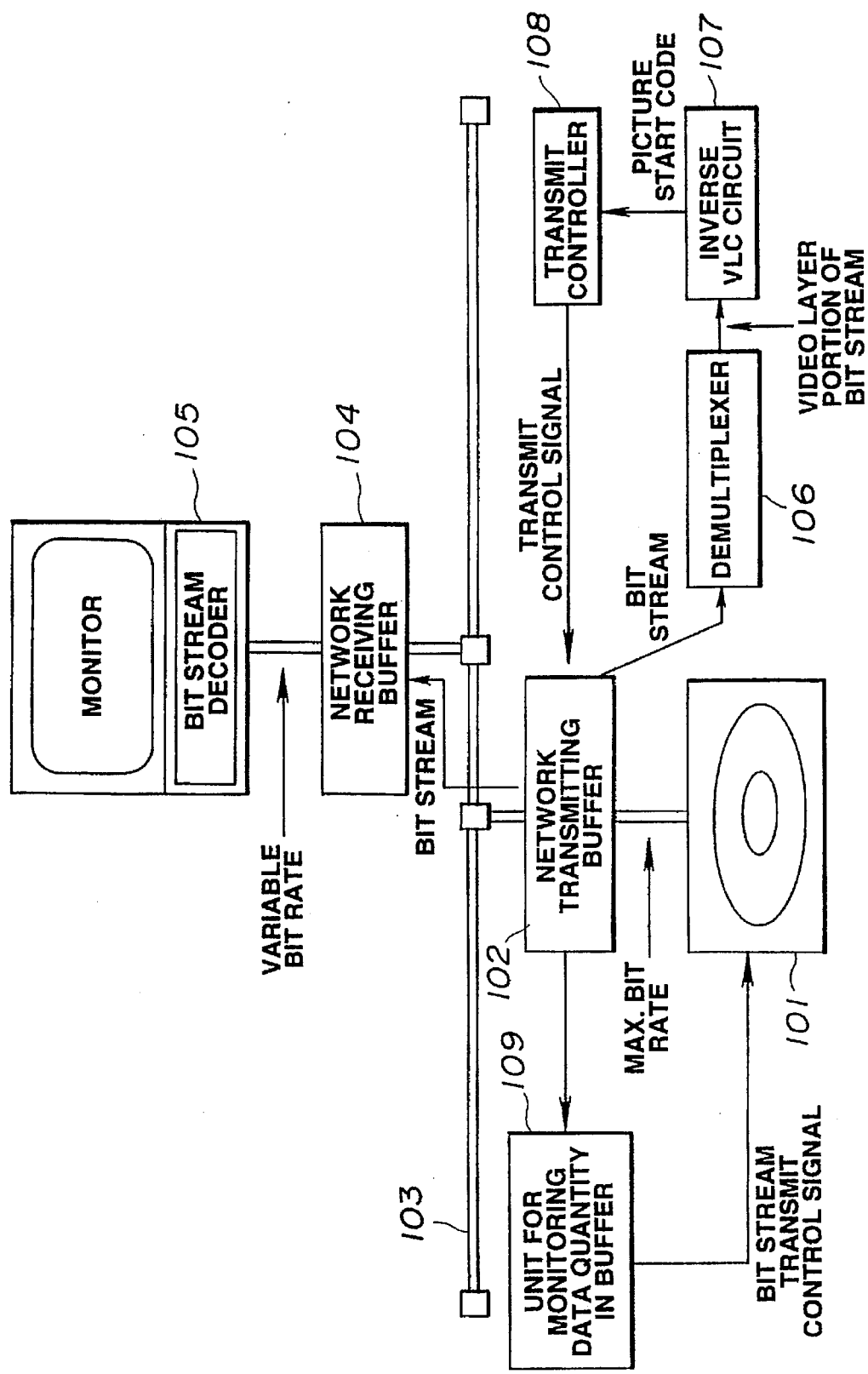
FIG. 20 is a third example of the configuration of system in reproducing bit stream of variable bit rate in moving picture signal recording/reproducing system of this invention.

A further embodiment of a moving picture reproducing system having a function to solve the problems described in the embodiment 3 is shown in FIG. 20.

Bit stream reading unit 101 reads out bit stream from recording media at maximum bit rate to send it to network transmitting buffer 102.

Local demultiplexer 106 reads out bit stream from network transmitting buffer 102 to carry out local demultiplexing processing. As a result, decoding of system layer positioned at the highest rank in structure of bit stream of MPEG is carried out. Thus, bit stream is divided into video layer and audio layer.

Inverse VLC circuit 107 receives video layer portion of bit stream from local demultiplexer 106 to carry out inverse VLC. As a result, picture start code of MPEG necessarily existing at the leading portion of bit stream every frame is locally decoded from bit stream.

Picture start code is sent to transmit controller 108. The transmit controller 108 demultiplexes bit streams of one frame to obtain, from inverse VLC circuit 107, picture start code information obtained every time the portion of video layer is caused to undergo inverse VLC.

Transmit controller 108 allows network transmitting buffer to initially start transmission of bit streams of the first frame. Further, responding to picture start code indicating the leading portion of the next frame, the transmit controller 108 sends transmit interrupt signal to network transmitting buffer 102.

If corresponding bit stream is a bit stream of display time of one frame, e.g., 30 frames per second after transmission is started, until time of 1/30 seconds is passed, the transmit controller 108 interrupts transmission of bit stream. If a predetermined time is passed, the transmit controller 108 sends signal of re-transmission of bit stream to restart transmission of bit stream.

Network transmitting buffer 102 responds to bit stream transmit command from transmit controller 108 to wait until there results the state where digital network 103 is not occupied by any other unit to transmit bit stream to digital network 103 as soon as digital network 103 becomes empty.

Since operations at times subsequent thereto are entirely the same as those in the case of embodiment 4, explanations of the operation of unit 109 for monitoring data quantity in buffer, the transmitting state of reproduction bit streams within digital network 103, and the like will be omitted.

Network receiving buffer 104 provided at the bit stream decoder side waits until bit stream transmitted from a predetermined bit stream reproducing unit is sent from digital network 103 to store the transmitted predetermined bit stream into buffer.

Bit stream decoder 105 reads out bit streams from network receiving buffer 104 as occasion demands while making reference to data remaining quantity of buffer provided within decoder to carry out decoding thereof.

Accordingly, in this system, since quantity of bit streams decoded at bit stream decoder 95 and quantity of bit streams transmitted from digital network 93 to network receiving buffer 94 are equal to each other per unit time, there is no possibility in the network receiving buffer 94 that overflow/underflow may take place. Therefore, unit for monitoring data quantity in buffer of the bit stream decoder side as described in the embodiment 3 is not required.

Accordingly, also in this system, since quantity of bit streams decoded at bit stream decoder 105 and quantity of bit streams transmitted from digital network 103 to network receiving buffer 104 are equal to each other per unit time, there is no possibility in network receiving buffer 104 that overflow/underflow may take place. Therefore, unit for monitoring data quantity in buffer of the bit stream decoder side as described in the embodiment 3 is not required.

Transmit controller 108 controls transmission of bit streams in this way, thereby making it possible to use bit streams of variable bit rate as well in this system.

(6) Embodiment 6

While unit of transmission is transmission is caused to be one frame in the embodiments 4 and 5, it is not necessarily required that this unit is one frame, but such unit of transmission may be, e.g., one GOP, etc. In this case, it is necessary to allow capacities of network transmitting buffer and network receiving buffer to be suitably large in dependency upon time serving as unit.

It should be noted that, in the systems of the embodiments 3~6, bit streams of constant (fixed) bit rate may be of course utilized.

(7) Embodiment 7

There is the problem that moving picture recording/reproducing system according to this invention is used to record bit streams onto bit stream recording unit, such as, for example, digital VTR, for a time period during which unit except for bit stream reproducing unit which attempts to receive bit stream occupies digital network, bit stream recording unit cannot receive bit stream, thus failing to satisfactorily carry out recording.

Figure 21:
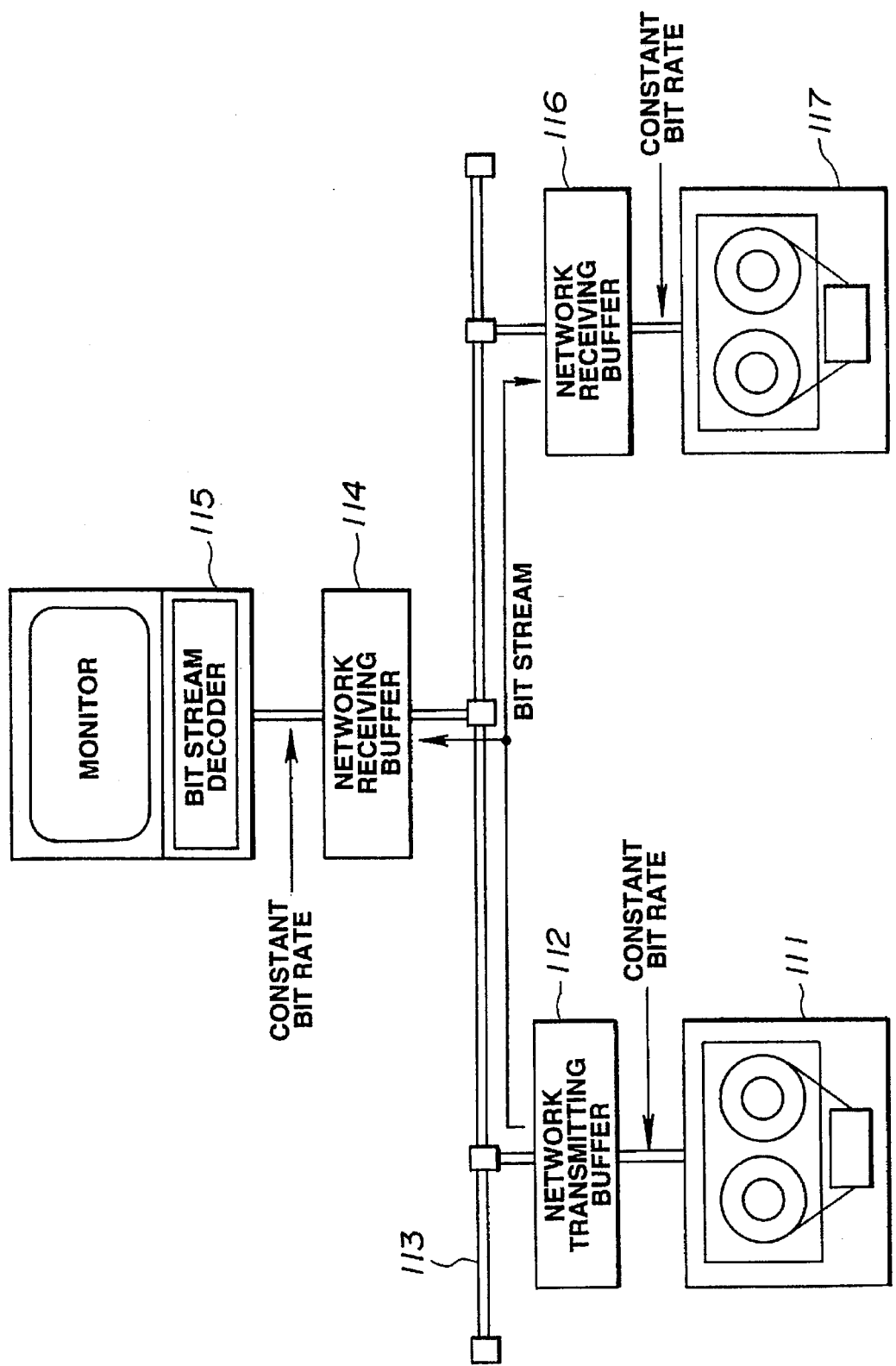
FIG. 21 is an example of the configuration of system in recording bit stream of constant bit rate in moving picture signal recording/reproducing system of this invention.

An example of the system configuration in the case of recording bit streams, which are reproduced from bit stream reproducing unit for reproducing other constant bit streams, onto bit stream recording unit in which bit streams received by the bit stream recording unit are constant bit rate, such as, for example, digital VTR by using moving picture recording/reproducing system according to this invention is shown in FIG. 21.

In this system, network transmitting buffer 112 and network receiving buffer 116 are respectively provided at the bit stream reading unit side and the bit stream recording unit side, thereby solving this problem.

Bit stream reading unit 111 reads out bit stream from recording media at a predetermined bit rate to send it to network transmitting buffer 112.

Network transmitting buffer 112 waits until there results the state where digital network 113 is not occupied by any other unit to transmit bit stream to digital network 113 as soon as digital network 113 becomes empty.

Network receiving buffer 114 provided at the bit stream decoder side waits until bit stream transmitted from a predetermined bit stream reproducing until is sent from digital network 113 to store the transmitted predetermined bit stream into buffer.

Bit stream decoder 115 reads out bit stream from network receiving buffer 114 at a predetermined bit rate to carry out decoding thereof.

It is to be noted that in the case where only recording of bit streams is aimed, circuit components of the moving picture display unit side such as network receiving buffer 114, bit stream decoder 115 and the like are not necessarily required.

Network receiving buffer 116 provided at the bit stream recording unit side waits until bit stream transmitted from a predetermined bit stream reproducing unit is sent from digital network 113 to store the transmitted predetermined bit stream into buffer.

Bit stream recording unit 117 reads out bit stream from network receiving buffer 116 at a predetermined bit rate to record it onto recording media.

Since digital network 113 can carry out communication at a bit rate sufficiently higher than maximum bit rate of bit stream, even in the case arbitrary number of other bit stream reproducing units are connected to digital network 113, this system permits transmission and reception of bit streams without problem.

Industrial Applicability (1) In moving picture recording/reproducing system according to this invention, since bit stream reading unit, bit stream decoding unit (decoder) and bit stream recording unit are linked (connected) by digital network, it is sufficient to provide only one bit stream decoding unit (decoder) on the moving picture display unit side. Thus, cost of bit stream decoding unit and/or moving picture encoding unit can be reduced.

(2) Unit for decoding bit stream monitors data remaining quantity of buffer to send bit stream transmit/transmit interrupt signal through digital network by that remaining quantity. On the other hand, unit for reading out bit stream receives that signal through digital network to switch bit stream transmit/transmit interrupt operation by that signal, or the unit for reading out bit stream takes out, from the bit stream which has been read out, timing information by which that bit stream is displayed to intermittently transmit bit streams to digital network on the basis of that timing information. Thus, even in the case of carrying out transmission and reception of bit streams through digital network as in this invention, bit streams of variable rate can be used.

What is claimed is:

1. A transmission method for bit streams including picture data generated by carrying out encoding,
   the method comprising the steps of:
     reproducing the bit stream from recording media on which the bit streams are recorded or radio wave, using reproducing equipment having only the bit stream reproducing function without having a decoding function;
     transmitting the reproduced bit stream to a high speed digital network;
     receiving the bit stream transmitted through the high speed digital network; and
     decoding or recording the received bit stream using a decoder having only the function of decoding the bit stream connected via the high speed digital network.

2. A transmission method for bit streams as set forth in claim 1,
   the method including the steps of:
     storing the reproduced bit stream into a transmitting buffer;
     reading out the bit stream from the transmitting buffer to transmit it to the high speed digital network;
     storing the received bit stream into a receiving buffer; and
     reading out the bit stream from the receiving buffer to carry out the decoding or the recording.

3. A transmission method for bit streams as set forth in claim 2,
   the method including the steps of:
     reproducing the bit stream from the recording media at a constant bit rate;
     storing the reproduced bit stream into the transmitting buffer at the constant bit rate; and
     reading out the bit stream from the receiving buffer at the constant bit rate.

4. A transmission method for bit streams as set forth in claim 2,
   wherein the bit stream is data encoded at a variable bit rate,
   the method including the steps of:
     reproducing the bit stream from the recording media at a maximum bit rate;
     storing the reproduced bit stream into the transmitting buffer at the maximum bit rate;
     controlling reproduction of the bit stream by a predetermined control signal; and
     reading out the bit stream from the receiving buffer at a variable bit rate.

5. A transmission method for a bit streams as set forth in claim 4,
   the method including the step of:
     generating the predetermined control signal on the basis of a data storage quantity of the receiving buffer.

6. A transmission method for bit streams as set forth in claim 4,
   the method including the steps of:
     detecting a data storage quantity of the transmitting buffer; and
     generating the predetermined control signal on the basis of the data storage quantity.

7. A transmission method for bit streams including picture data generated by carrying out encoding, wherein the bit stream is data encoded at a variable bit rate,
   the method comprising the steps of:
     reproducing a bit stream from a recording media at a maximum bit rate;
     storing the bit stream into a transmitting buffer at the maximum bit rate;
     reading out the bit stream stored in the transmitting buffer;
     detecting time stamp information of the MPEG system added every data of a predetermined time from the bit stream which has been read out;
     transmitting the read out bit stream to a high speed digital network;
     controlling a transmission timing of the transmitting buffer on the bases of the time stamp information;
     receiving the bit stream transmitted through the high speed digital network;
     storing the received bit stream into a receiving buffer; and
     reading out the bit stream from the receiving buffer to carry out the decoding or the recording.

8. A transmission method for bit streams including picture data generated by carrying out encoding, wherein the bit stream is data encoded at a variable bit rate,
   the method comprising the steps of:
     reproducing a bit stream from a recording media at a maximum bit rate;
     storing the bit stream into a transmitting buffer at the maximum bit rate;
     reading out the bit stream stored in the transmitting buffer;
     detecting a start code of the MPEG system added every predetermined picture data unit from the bit stream which has been read out;
     transmitting the read out bit stream to a high speed digital network;
     controlling a transmission timing of the transmitting buffer on the bases of the start code;
     receiving the bit stream transmitted through the high speed digital network;
     storing the received bit stream into a receiving buffer; and
     reading out the bit stream from the receiving buffer to carry out the decoding or the recording.

9. A transmission method for bit streams including picture data generated by carrying out encoding, the method including the steps of:

reproducing the bit stream from recording media on which the bit streams are recorded or radio wave, using a reproducing equipment having only the bit stream reproducing function without having the decoding function; and transmitting the reproduced bit stream to a high speed digital network.

10. A transmission method for bit streams as set forth in claim 9, the method including the steps of:

storing the reproduced bit stream into a transmitting buffer; and reading out the bit stream from the transmitting buffer to transmit it to the high speed digital network.

11. A transmission method for bit streams as set forth in claim 10, the method including the steps of:

reproducing the bit stream from the recording media at a constant bit rate; and storing the reproduced bit stream into the transmitting buffer at the constant bit rate.

12. A transmission method for bit streams as set forth in claim 10, wherein the bit stream is data encoded at a variable bit rate, the method including the steps of:

reproducing the bit stream from the recording media at a maximum bit rate;

storing the reproduced bit stream into the transmitting buffer at the maximum bit rate; and controlling reproduction of the bit stream by a predetermined control signal.

13. A transmission method for bit streams as set forth in claim 12, wherein the predetermined control signal is a signal based on a data storage quantity of a receiving buffer for receiving the bit stream from the high speed network.

14. A transmission method for bit streams as set forth in claim 12, the method including the steps of:

detecting a data storage quantity of the transmitting buffer; and generating the predetermined control signal on the basis of the data storage quantity.

15. A transmission method for bit streams including picture data generated by carrying out encoding, wherein the bit stream is data encoded at a variable bit rate, the method including the steps of:

reproducing the bit stream from recording media on which the bit streams are recorded, wherein the bit stream is reproduced at a maximum bit rate;

controlling reproduction of the bit stream by a predetermined control signal;

storing the reproduced bit stream into a transmitting buffer at the maximum bit rate;

reading out the bit stream stored in the transmitting buffer;

detecting time stamp information of the MPEG system added every data of a predetermined time from the bit stream which has been read out;

controlling a transmission timing of the transmitting buffer on the basis of the time stamp information; and transmitting the bit stream read out of the transmitting buffer to a high speed digital network.

16. A transmission method for bit streams including picture data generated by carrying out encoding, wherein the bit stream is data encoded at a variable bit rate, the method including the steps of:

reproducing the bit stream from recording media on which the bit streams are recorded, wherein the bit stream is reproduced at a maximum bit rate;

controlling reproduction of the bit stream by a predetermined control signal;

storing the reproduced bit stream into a transmitting buffer at the maximum bit rate;

reading out the bit stream stored in the transmitting buffer;

detecting a start code of the MPEG system added every predetermined picture data unit from the bit stream which has been read out;

controlling a transmission timing of the transmitting buffer on the basis of the start code; and transmitting the bit stream read out of the transmitting buffer to a high speed digital network.

17. A transmission method for bit streams including picture data generated by carrying out encoding;

the method comprising the steps of:

receiving the bit stream transmitted through a high speed digital network; and decoding or recording the bit stream using a decoder having only the function of decoding the bit stream connected via said high speed digital network.

18. A transmission method for bit streams as set forth in claim 17, the method including the steps of:

storing the received bit stream into a receiving buffer; and reading out the bit stream from the receiving buffer to carry out the decoding or the recording.

19. A transmission method for bit streams as set forth in claim 18, the method including the step of:

reading out the bit stream from the receiving buffer at a constant bit rate.

20. A transmission method for bit streams as set forth in claim 18, the method including the step of:

reading out the bit stream from the receiving buffer at a variable bit rate.

21. A transmission method for bit streams as set forth in claim 18, the method including the steps of:

reading out the bit stream from the receiving buffer at a variable bit rate; and generating a predetermined control signal for controlling transmission of the transmitting side on the basis of a data storage quantity of the receiving buffer.

22. A transmission system for bit streams including picture data generated by carrying out encoding;

the system comprising:

a high speed digital network;

reproducing means for reproducing the bit stream from recording media on which the bit streams are recorded or radio wave, wherein the reproducing means has only reproducing function without having a decoding function;

transmitting means for transmitting the reproduced bit stream to the high speed digital network;

receiving means for receiving the bit stream transmitted through the high speed digital network; and means for decoding or recording the received bit stream, wherein means for decoding the bit stream only decodes the bit stream connected via the high speed digital network.

23. A transmission system for bit streams as set forth in claim 22, wherein the transmitting means is a transmitting buffer for storing the reproduced bit stream to read out the stored bit stream, and wherein the receiving means is a receiving buffer for storing a received bit stream to read out the stored bit stream.

24. A transmission system for bit streams as set forth in claim 23, wherein the reproducing means reproduces the bit stream from the recording media at a constant bit rate, wherein the transmitting buffer stores the reproduced bit stream at a constant bit rate, and wherein the receiving buffer reads out the bit stream at the constant bit rate.

25. A transmission system for bit streams as set forth in claim 23, wherein the bit stream is data encoded at a variable bit rate, wherein the reproducing means reproduces the bit stream from the recording media at a maximum bit rate, and is such that reproduction is controlled by a predetermined control signal, wherein the transmitting buffer stores the reproduced bit stream at are maximum bit rate, and wherein the receiving buffer reads out the bit stream at the variable bit rate.

26. A transmission system for bit streams as set forth in claim 23, which includes:

control means for generating the predetermined control signal on the basis of a data storage quantity of the receiving buffer.

27. A transmission system for bit streams as set forth in claim 23, which includes:

control means for generating the predetermined control signal on the basis of a data storage quantity of the transmitting buffer.

28. A transmission system for bit streams including picture data generated by carrying out encoding;

the system comprising:

a high speed digital network;

reproducing means for reproducing the bit stream from recording media on which the bit streams are recorded;

transmitting buffer for storing the reproduced bit stream, reading read out the stored bit stream, and transmitting the reproduced bit stream to the high speed digital network;

detecting means for detecting time stamp information of the MPEG system added every data of a predetermined time from the bit stream stored in the transmitting buffer;

control means for controlling a transmission timing of the transmitting buffer on the basis of the time stamp information;

receiving buffer for receiving and storing the bit stream transmitted through the high speed digital network; and means for decoding or recording the bit stream stored in the receiving buffer.

29. A transmission system for bit streams including picture data generated by carrying out encoding;

the system comprising:

a high speed digital network;

reproducing means for reproducing the bit stream from recording media on which the bit streams are recorded;

transmitting buffer for storing the reproduced bit stream, reading read out the stored bit stream, and transmitting the reproduced bit stream to the high speed digital network;

detecting means for detecting a start code of the MPEG system added every predetermined picture data unit from the bit stream stored in the transmitting buffer;

control means for controlling a transmission timing of the transmitting buffer on the basis of the start code;

receiving buffer for receiving and storing the bit stream transmitted through the high speed digital network; and means for decoding or recording the bit stream stored in the receiving buffer.

30. A transmission apparatus for bit streams including picture data generated by carrying out encoding, the apparatus comprising:

reproducing means for reproducing the bit stream from recording media on which the bit streams are recorded or radio wave, wherein the reproducing means has only reproducing function without having a decoding function;

transmitting means for transmitting the reproduced bit stream to a high speed digital network.

31. A transmission apparatus for bit streams as set forth in claim 30, wherein the transmitting means is a transmitting buffer for storing the reproduced bit stream to read out the stored bit stream.

32. A transmission apparatus for bit streams as set forth in claim 31, wherein the reproducing means reproduces the bit stream from the recording media at a constant bit rate, and wherein the transmitting buffer stores the reproduced bit stream at the constant bit rate.

33. A transmission apparatus for bit streams as set forth in claim 31, wherein the bit stream is data encoded at a variable bit rate, wherein the reproducing means reproduces the bit stream from the recording media at a maximum bit rate and is such that reproduction of the bit stream is controlled by a predetermined control signal, and wherein the transmitting buffer stores the reproduced bit stream at the maximum bit rate.

34. A transmission apparatus for bit streams as set forth in claim 33, wherein the predetermined control signal is a signal based on a data storage quantity of a receiving buffer for receiving the bit stream from the high speed network.

35. A transmission apparatus for bit streams as set forth in claim 33, which includes:

control means for generating the predetermined control signal on the basis of a data storage quantity of the transmitting buffer.

36. A transmission apparatus for bit streams including picture data generated by carrying out encoding, wherein the bit stream is data encoded at a variable bit rate, the apparatus comprising:
reproducing means for reproducing the bit stream from a recording media at a maximum bit rate, and is such that the reproduction of the bit stream is controlled by a predetermined control signal;
transmitting buffer for storing the reproduced bit stream at the maximum bit rate and transmitting the reproduced bit stream to a high speed digital network;
detecting means for detecting time stamp information of the MPEG system added every data of a predetermined time from the bit stream stored in the transmitting buffer; and
control means for controlling a transmission timing of the transmitting buffer on the basis of the time stamp information.

37. A transmission apparatus for bit streams including picture data generated by carrying out encoding, wherein the bit stream is data encoded at variable bit rate,
the apparatus comprising:
reproducing means for reproducing the bit stream from recording media at a maximum bit rate, and is such that the reproduction of the bit stream is controlled by a predetermined control signal;
transmitting buffer for storing the reproduced bit stream at the maximum bit rate and transmitting the reproduced bit stream to a high speed digital network;
detecting means for detecting a start code of the MPEG system added every predetermined picture data unit from the bit stream stored in the transmitting buffer; and
control means for controlling a transmission timing of the transmitting buffer on the basis of the start code.

38. A transmission apparatus for bit streams including picture data generated by carrying out encoding,
the apparatus comprising:
receiving means for receiving the bit stream transmitted through a high speed digital network; and
means for decoding or recording the received bit stream, wherein means for decoding the bit stream only decodes the bit stream connected via the high speed digital network.

39. A transmission apparatus for bit streams as set forth in claim 38,
wherein the receiving means is a receiving buffer for storing a received bit stream to read out the stored bit stream.

40. A transmission apparatus for bit streams as set forth in claim 39,
wherein the bit stream is read out from the receiving buffer at a constant bit rate.

41. A transmission apparatus for bit streams as set forth in claim 39,
wherein the bit stream is read out from the receiving buffer at a variable bit rate.

42. A transmission apparatus for bit streams as set forth in claim 39, which includes:
control means for reading out the bit stream from the receiving buffer at a variable bit rate, and
generating a predetermined control signal for controlling transmission of the transmitting side on the basis of a data storage quantity of the receiving buffer.

43. A transmission method for bit streams as set forth in claim 4,
the method including the steps of:
reading out the bit stream stored in the transmitting buffer;
detecting time stamp information of the MPEG system added every data of a predetermined time from the bit stream which has been read out; and
controlling a transmission timing of the transmitting buffer on the basis of the time stamp information.

44. A transmission method for bit streams as set forth in claim 4,
the method including the steps of:
reading out the bit stream stored in the transmitting buffer;
detecting a start code of the MPEG system added every predetermined picture data unit from the bit stream which has been read out; and
controlling a transmission timing of the transmitting buffer on the basis of the start code.

45. A transmission method for bit streams as set forth in claim 12,
the method including the steps of:
reading out the bit stream stored in the transmitting buffer;
detecting time stamp information of the MPEG system added every data of a predetermined time from the bit stream which has been read out;
and controlling a transmission timing of the transmitting buffer on the basis of the time stamp information.

46. A transmission method for bit streams as set forth in claim 12,
the method including the steps of:
reading out the bit stream stored in the transmitting buffer;
detecting a start code of the MPEG system added every predetermined picture data unit from the bit stream which has been read out; and
controlling a transmission timing of the transmitting buffer on the basis of the start code.

47. A transmission system for bit streams as set forth in claim 23, which includes:
detecting means for detecting time stamp information of the MPEG system added every data of a predetermined time from the bit stream stored in the transmitting buffer; and
control means for controlling a transmission timing of the transmitting buffer on the basis of the time stamp information.

48. A transmission system for bit streams as set forth in claim 23, which includes:
detecting means for detecting a start code of the MPEG system added every predetermined picture data unit from the bit stream stored in the transmitting buffer; and
control means for controlling a transmission timing of the transmitting buffer on the basis of the start code.

49. A transmission apparatus for bit streams as set forth in claim 33, which includes:
detecting means for detecting time stamp information of the MPEG system added every data of a predetermined time from the bit stream stored in the transmitting buffer; and
control means for controlling a transmission timing of the transmitting buffer on the basis of the time stamp information.

50. A transmission apparatus for bit streams as set forth in claim 33, which includes:
detecting means for detecting a start code of the MPEG system added every predetermined picture data unit from the bit stream stored in the transmitting buffer; and control means for controlling a transmission timing of the transmitting buffer on the basis of the start code.

51. A method for transmitting bit streams including picture data generated by carrying out encoding, the method comprising the steps of:

reproducing the bit stream from recording media on which the bit streams are recorded or radio wave;

storing the reproduced bit stream in a network transmitting buffer;

transmitting the reproduced bit stream from the network transmitting buffer to a high speed digital network;

receiving the bit stream transmitted through the high speed digital network;

storing the received bit stream in a network receiving buffer; and recording the received bit stream.

52. A system for transmitting bit streams including picture data generated by carrying out encoding, the system comprising:

reproducing means for reproducing a bit stream from recording media on which the bit stream is recorded or radio wave;

a network transmitting buffer for storing the reproduced bit stream;

transmitting means for transmitting the reproduced bit stream from the network transmitting buffer to a high speed digital network;

a network receiving buffer for receiving the bit stream transmitted through the high speed digital network; and a means for recording the received bit stream from the network receiving buffer.

* * * * *